US012804302B2

(12) United States Patent
Sullivan et al.

(10) Patent No.: US 12,804,302 B2
(45) Date of Patent: Nov. 17, 2026

(54) IN-EAR EARPIECE RETAINING PIECE

(71) Applicant: Bose Corporation, Framingham, MA (US)

(72) Inventors: Donna Marie Sullivan, Millbury, MA (US); Allen T. Graff, Sutton, MA (US); Brian David Beaudoin, Medway, MA (US)

(73) Assignee: Bose Corporation, Framingham, MA (US)

( * ) Notice: Subject to any disclaimer, the term of this patent is extended or adjusted under 35 U.S.C. 154(b) by 75 days.

(21) Appl. No.: 18/589,380

(22) Filed: Feb. 27, 2024

(65) Prior Publication Data

US 2025/0274694 A1 Aug. 28, 2025

(51) Int. Cl.
*H04R 1/10* (2026.01)

(52) U.S. Cl.
CPC .......... *H04R 1/105* (2013.01); *H04R 1/1016* (2013.01); *H04R 1/1066* (2013.01)

(58) Field of Classification Search
CPC .......... H04R 9/06; H04R 1/025; H04R 9/025; H04R 31/006; H04R 2400/11; H04R 7/20; H04R 2499/13; H04R 1/023; H04R 1/2834; H04R 9/045; H04R 1/02; H04R 9/022; H04R 9/02; H04R 9/043; H04R 1/021; H04R 7/06; H04R 31/00; H04R 9/04; H04R 1/026; H04R 9/063; H04R 1/06; H04R 1/2896; H04R 7/16; H04R 7/18; H04R 1/028; H04R 3/00; H04R 1/24; H04R 1/345; H04R 1/403; H04R 2209/024; H04R 2307/204; H04R 3/14; H04R 7/127; H04R 9/046; H04R 1/2811; H04R 1/288; H04R 2307/207; H04R 2201/028; H04R 2201/34; H04R 2420/09; H04R 2499/11; H04R 7/122; H04R 1/00; H04R 1/26; H04R 1/2819; H04R 1/1058; H04R 25/654; H04R 1/1016; H04R 1/1008; H04R 1/105; H04R 2460/17; H04R 1/1091; H04R 1/1083; H04R 25/65; H04R 25/02; H04R 25/60;

(Continued)

(56) References Cited

U.S. PATENT DOCUMENTS

| | | | | |
|---|---|---|---|---|
| 7,577,465 B2 * | 8/2009 | Cheng | H04R 1/1058 381/376 |
| 8,838,030 B2 * | 9/2014 | Liao | H04R 1/1091 455/41.2 |
| 10,021,476 B2 * | 7/2018 | Kolton | H04R 1/1058 |

(Continued)

FOREIGN PATENT DOCUMENTS

| | | |
|---|---|---|
| EP | 3082347B1 A | 10/2016 |
| GB | 2534385 A | 7/2016 |
| WO | 2021207332 W | 10/2021 |

OTHER PUBLICATIONS

International Search Report (PCT/ISA/210) for PCT/US2025/017571, mailed May 28, 2025, issued by European Patent Office (ISA).

(Continued)

*Primary Examiner* — Carolyn R Edwards
*Assistant Examiner* — Julie X Dang

(57) ABSTRACT

A retaining piece for an earpiece includes a compliant member for engaging a user's concha and a coupling member for engaging an earbud of the earpiece. The coupling member includes a snap for engaging a pocket in the earbud.

23 Claims, 25 Drawing Sheets

(58) Field of Classification Search
CPC ........................... H04R 25/607; H04R 25/609; H04R 2225/57; H04R 2420/03
See application file for complete search history.

(56) References Cited

U.S. PATENT DOCUMENTS

| | | | | |
|---|---|---|---|---|
| 10,820,084 | B2 * | 10/2020 | Zalisk | H04R 1/1016 |
| 2004/0052364 | A1 * | 3/2004 | Bodley | H04R 1/1066 379/430 |
| 2007/0217643 | A1 * | 9/2007 | Chang | H04R 1/1066 381/381 |
| 2012/0039501 | A1 * | 2/2012 | Silvestri | H04R 1/1075 381/380 |
| 2013/0058517 | A1 * | 3/2013 | Lee | H04R 1/105 381/380 |
| 2013/0230204 | A1 * | 9/2013 | Monahan | H04R 1/1016 381/380 |
| 2016/0309250 | A1 * | 10/2016 | Kelly | H04R 25/652 |
| 2021/0104217 | A1 * | 4/2021 | Liu | G10K 11/17881 |

OTHER PUBLICATIONS

Written Opinion of the International Searching Authority (PCT/ISA/237) for PCT/US2025/017571, completed May 15, 2025, European Patent Office.

* cited by examiner

IN-EAR EARPIECE RETAINING PIECE

BACKGROUND

U.S. Pat. No. 11,297,408, titled "IN-EAR EARPIECE RETAINING STRUCTURE," describes a retaining piece for an earpiece that is removable from an earbud of the earpiece. The removability allows different sized retaining pieces to be used with the earbud to accommodate different ear geometries.

The retaining piece includes a band (aka attachment feature) that wraps around the earbud and cantilevered portions. The cantilevered portions are configured to generally follow the geometry of a user's ear and is specific to the earbud (i.e., left or right earbud) that it is configured to be used with.

However, some users might find it difficult to install the retaining piece on the earbud properly. For example, the design of the band-style retaining piece can allow it to be installed upside down, backwards and/or on the wrong earbud (e.g., a left band on a right earbud). As a result, not only would the earbud not engage the user's ear correctly, but the earbuds might not seat in a charging case correctly. When not seated in the charging case correctly, the earbuds might not charge, and, in some cases, the user will not be able to initiate Bluetooth pairing, which, in some cases, requires the earbuds to be properly seated in their charging case.

SUMMARY

All examples and features mentioned below can be combined in any technically possible way.

In one aspect, a retaining piece for an earpiece includes a compliant member for engaging a user's concha and a coupling member for engaging an earbud of the earpiece. The coupling member includes a snap for engaging a pocket in the earbud.

Implementations may include one of the following features, or any combination thereof.

In some implementations, the coupling member includes an alignment pin that is arranged to engage a socket in the earbud.

In certain implementations, the coupling member includes a base and the snap extends outwardly from a bottom surface of the base.

In some cases, the snap includes a protrusion having a first end that is connected to a bottom surface of the base; a second end, opposite the first end; and an extension that extends outwardly from the second end.

In certain cases, the coupling member includes an alignment pin having a first end that is connected to a bottom surface of the base and a second end, opposite the first end, that includes chamfered edges.

In some examples, the snap is formed integrally with the base.

In certain examples, the coupling member includes an alignment pin that extends outwardly from the bottom surface of the base.

In some implementations, the base, the snap, and the alignment pin are integrally formed as a unitary body.

In certain implementations, the coupling member includes one or more loops arranged along a top surface, opposite the bottom surface, of the base.

In some cases, the base, the snap, the alignment pin and the one or more loops are integrally formed as a unitary body.

In certain cases, the snap and base are formed of a thermoplastic material such as polycarbonate, polybutylene terephthalate (PBT) and polyethylene terephthalate (PET), polycarbonate/acrylonitrile butadiene styrene (PC/ABS), polyamide (nylon), polyether ether ketone (PEEK), or acrylonitrile butadiene styrene (ABS). The thermoplastic material may include glass-fill for stiffness.

In some examples, the compliant member includes a leg that is configured to fit under an antihelix of a wearer's ear when the earpiece is worn.

In certain examples, the leg applies pressure to the user's ear along the antihelix such that the retaining piece creates stability and pushes the earpiece towards the user's ear canal.

In some implementations, the coupling member includes a base and one or more loops disposed along a top surface of the base, and the compliant member is molded directly on the top surface of the base such that the one or more loops are encapsulated by the compliant member.

In certain implementations, the compliant member includes a leg that extends outwardly from the top surface of the base.

In some cases, the leg includes: a first end that is connected to the coupling member and a second, free end, opposite the first end, that is configured to be wedged under the anti-helix in the cymba concha region and contact the base of the helix.

In certain cases, the leg is curved to generally follow the curve of the anti-helix at the rear of the concha.

In some examples, the leg is made of silicone or thermoplastic elastomer (TPE), and has a durometer of about 16 Shore A to about 30 Shore A.

In certain examples, the leg lies in a plane, which bisects the leg, and a longitudinal axis of the base is coincident with the plane.

In some implementations, the plane bisects the coupling member such that the coupling member is symmetrical about the plane.

In certain implementations, the compliant member is made of silicone or thermoplastic elastomer (TPE), and has a durometer of about 16 Shore A to about 30 Shore A.

In another aspect, an earpiece includes an earbud that defining a pocket and a recess disposed within the pocket and a retaining piece. The retaining piece includes a compliant member for engaging a user's concha and a coupling member that includes a snap for engaging the pocket in the earbud.

Implementations may include one of the above and/or below features, or any combination thereof.

In some implementations, the coupling member is keyed to the pocket to inhibit incorrect coupling of the retaining piece to the earbud.

In certain implementations, the earbud defines a socket in the pocket and the coupling member includes an alignment pin that is arranged to engage the socket.

In some cases, the coupling member includes a base, and the snap and the alignment pin extend outwardly from a bottom surface of the base.

In certain cases, the bottom surface extends along a longitudinal axis of the base between a first, flat edge of the base and a second, round edge of the base.

In some examples, the recess has a complimentary flat edge and a complementary round edge that accommodate the flat edge and the round edge of the base, respectively.

In certain examples, the coupling member includes a base. The snap includes a protrusion having a first end that is connected to a bottom surface of the base, a second end, opposite the first end, and an extension that extends outwardly from the second end. The pocket includes one or more overhangs that engage the extension on the snap to secure the retaining piece to the housing.

In some implementations, the coupling member includes a base and one or more loops disposed along a top surface of the base, and the compliant member is molded directly on the top surface of the base such that the one or more loops are encapsulated by the compliant member.

In certain implementations, the compliant member includes a leg that extends outwardly from the top surface of the base.

In some cases. the leg includes: a first end that is connected to the coupling member and a second, free end, opposite the first end, that is configured to be wedged under the anti-helix in the cymba concha region and contact the base of the helix.

In certain cases, the snap extends outwardly from a bottom surface, opposite the top surface, of the base.

In some examples, the base, the snap, and the one or more loops are integrally formed as a unitary body.

In certain examples, the compliant member is configured to fit under an antihelix of a wearer's ear when the earpiece is worn.

In some implementations, the compliant member is configured to apply pressure to the user's ear along the antihelix such that the retaining piece creates stability and pushes the earpiece towards the user's ear canal.

In certain implementations, the earbud includes a housing, and the housing includes a first housing portion, a second housing portion, and a third housing portion that together define an acoustic module and an electronics module. The recess is defined in the first housing portion.

In some cases, the acoustic module houses an electro-acoustic transducer that divides the acoustic module into a first acoustic cavity and a second acoustic cavity, and the electronics module houses electronics for driving the electro-acoustic transducer.

In certain cases, the first housing portion substantially defines the acoustic module.

In some examples, the second housing portion and the third housing portion substantially define the second electronics module.

In certain examples the earbud includes a dividing plate that is arranged between the second acoustic cavity and the electronics module and separates the acoustic module from the electronics module.

In some implementations, the third housing portion carries one or more electrically conductive traces.

In certain implementations, the one or more electrically conductive traces are formed directly on an inner surface of the third housing portion via laser direct structuring (LDS).

In some cases, the one or more electrically conductive traces define one or more electrodes of a capacitive sensor.

In certain cases, the one or more electrically conductive traces defines an antenna for wireless communication.

In some examples, the snap includes a plurality of snaps.

In certain examples, each of the snaps includes a protrusion having a first end that is connected to a bottom surface of the base; a second end, opposite the first end; and an extension that extends outwardly from the second end.

In some implementations, the coupling member further includes a protuberance.

In certain implementations, the coupling member further includes a protuberance and a stiffening rib.

In some cases, the stiffening rib extends out from a center of the protuberance and is substantially perpendicular thereto.

In certain cases, the protuberance and the stiffening rib extend outwardly from a bottom surface of the base.

In some examples, the base, the snap, the protuberance, and the stiffening rib are integrally formed as a unitary body.

DETAILED DESCRIPTION

Commonly labeled components in the FIGURES are considered to be substantially equivalent components for the purposes of illustration, and redundant discussion of those components is omitted for clarity. Numerical ranges and values described according to various implementations are merely examples of such ranges and values and are not intended to be limiting of those implementations. In some cases, the term "about" may be used to modify values, and in these cases, can refer to that value +/− a margin of error, such as a measurement error, which may range from up to 1-5 percent.

Figure 1:
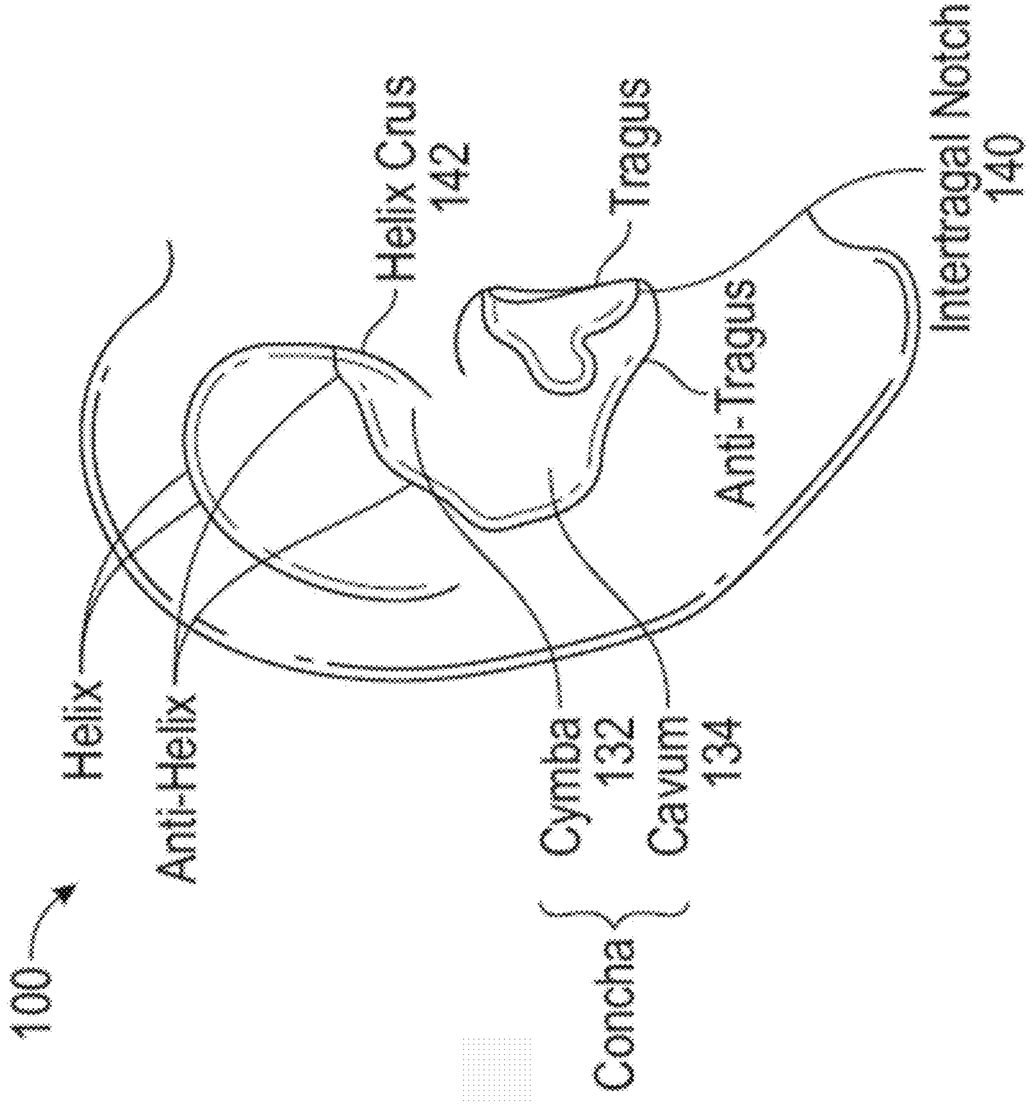
FIG. 1 is a view of the lateral surface of the human ear.

FIG. 1 shows the lateral surface of a human right ear, with some features identified. There are many different ear sizes and geometries. Some ears have additional features that are not shown in FIG. 1. Some ears lack some of the features that are shown in FIG. 1. Some features may be more or less prominent than are shown in FIG. 1.

The retaining piece described herein is configured to fit under the antihelix of a wearer's ear in the region 120 when the earpiece is worn. The retaining piece applies pressure to the ear along the antihelix. As a result, the retaining piece creates stability and pushes the earpiece towards the wearer's ear canal.

FIGS. 2A-2H illustrate an exemplary earpiece 200 for the right ear of a user. A mirror-image of the design would be used for an earpiece for the left ear. The earpiece 200 includes an earbud 202, an ear tip 204, and a retaining piece 206. The earbud 202 includes a housing 208 having a first housing portion 210, a second housing portion 212, and a third housing portion (cap) 214 that together define an acoustic module 216 and an electronics module 218. The ear tip 204 provides an acoustic seal with a user's ear when the earpiece 200 is used. The retaining piece 206 engages the user's antihelix when the earpiece is worn to assist with retaining the earpiece in the user's ear. The first, second, and third housing portions 210, 212, 214 may be formed of thermoplastic materials such as polycarbonate, polybutylene terephthalate (PBT) and polyethylene terephthalate (PET), polycarbonate/acrylonitrile butadiene styrene (PC/ABS), polyamide (nylon), polyether ether ketone (PEEK), or acrylonitrile butadiene styrene (ABS). Such thermoplastic materials may include glass-fill for stiffness. The first, second, and third housing portions 210, 212, 214 be secured together via an adhesive.

Figure 2A:
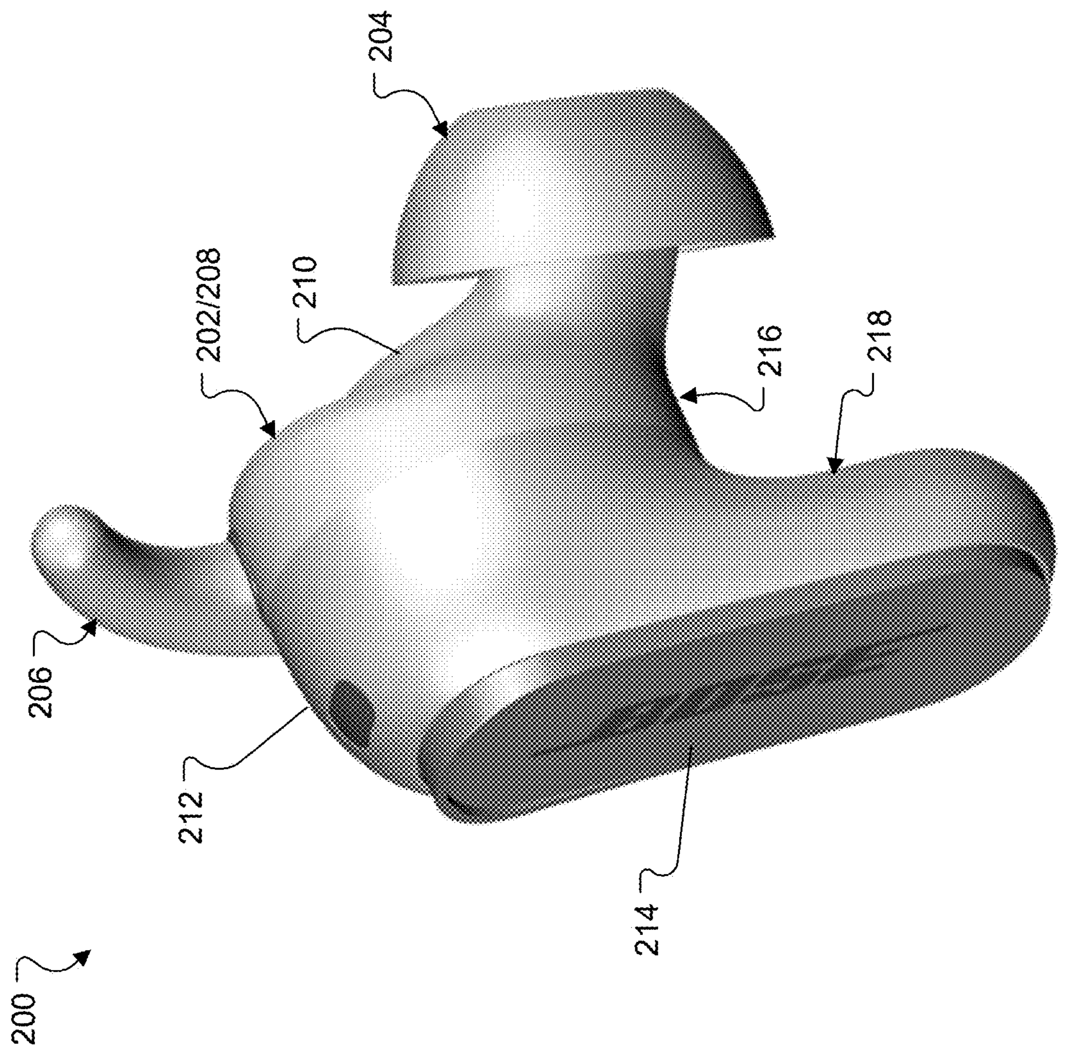
FIG. 2A is a perspective view of an earpiece.
Figure 2B:
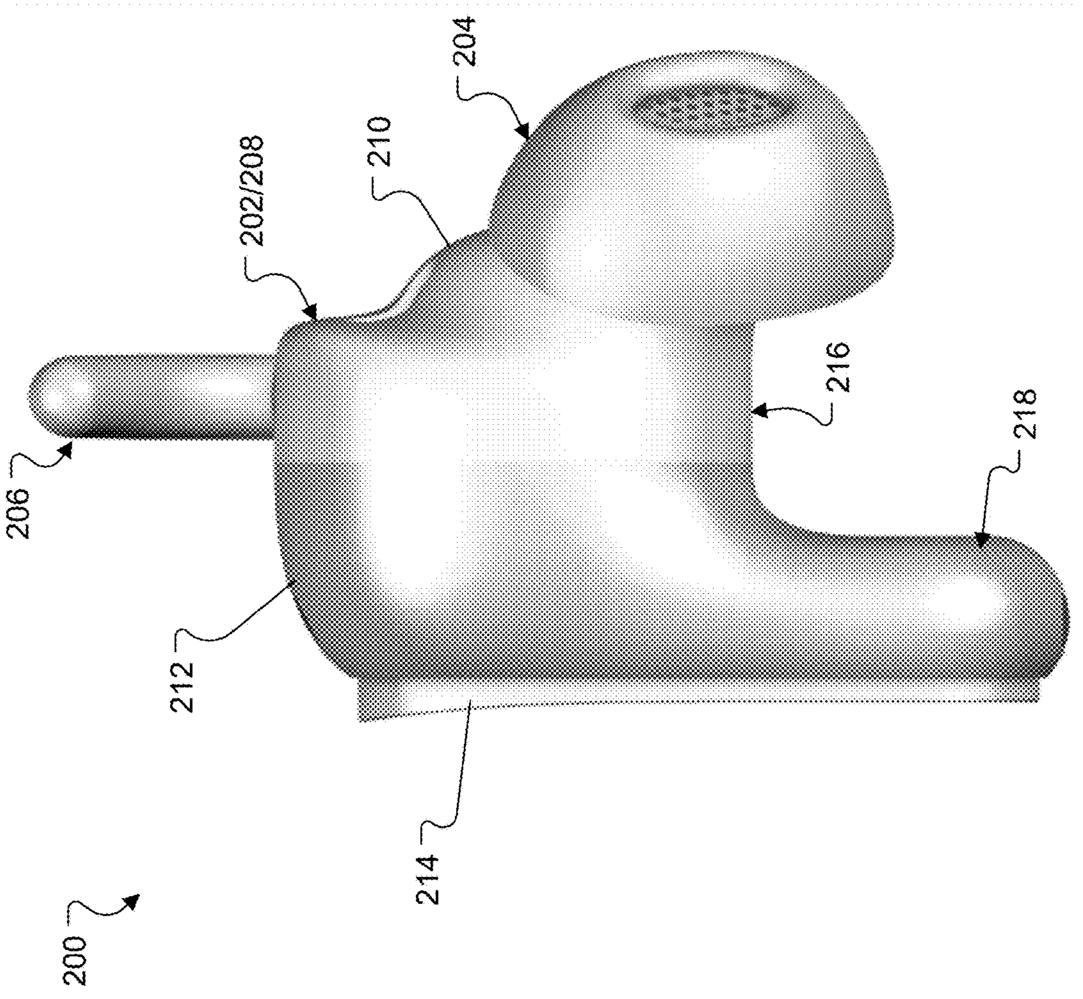
FIGS. 2B through 2G are front, rear, left side, right side, top and bottom views, respectively, of the earpiece of FIG. 2A.
Figure 2C:
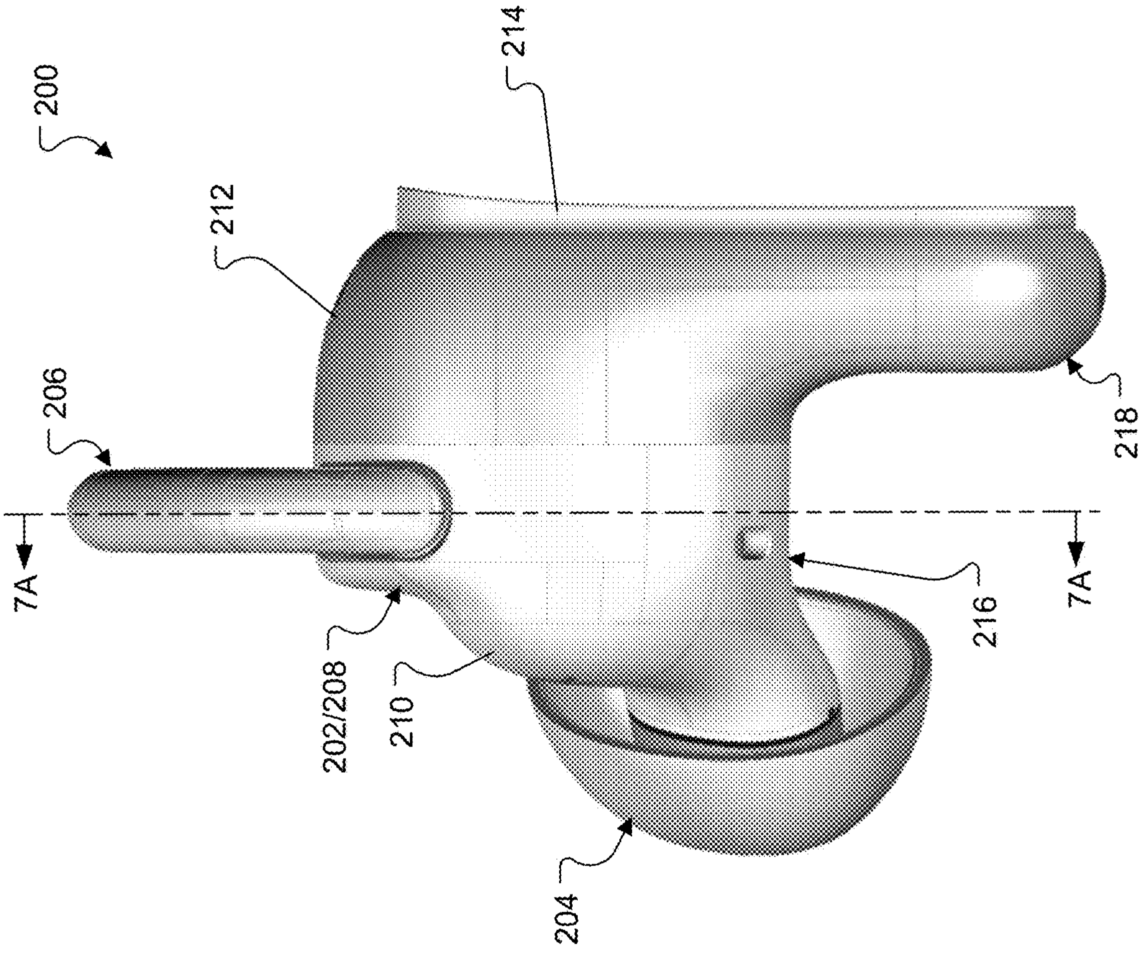
Figure 2D:
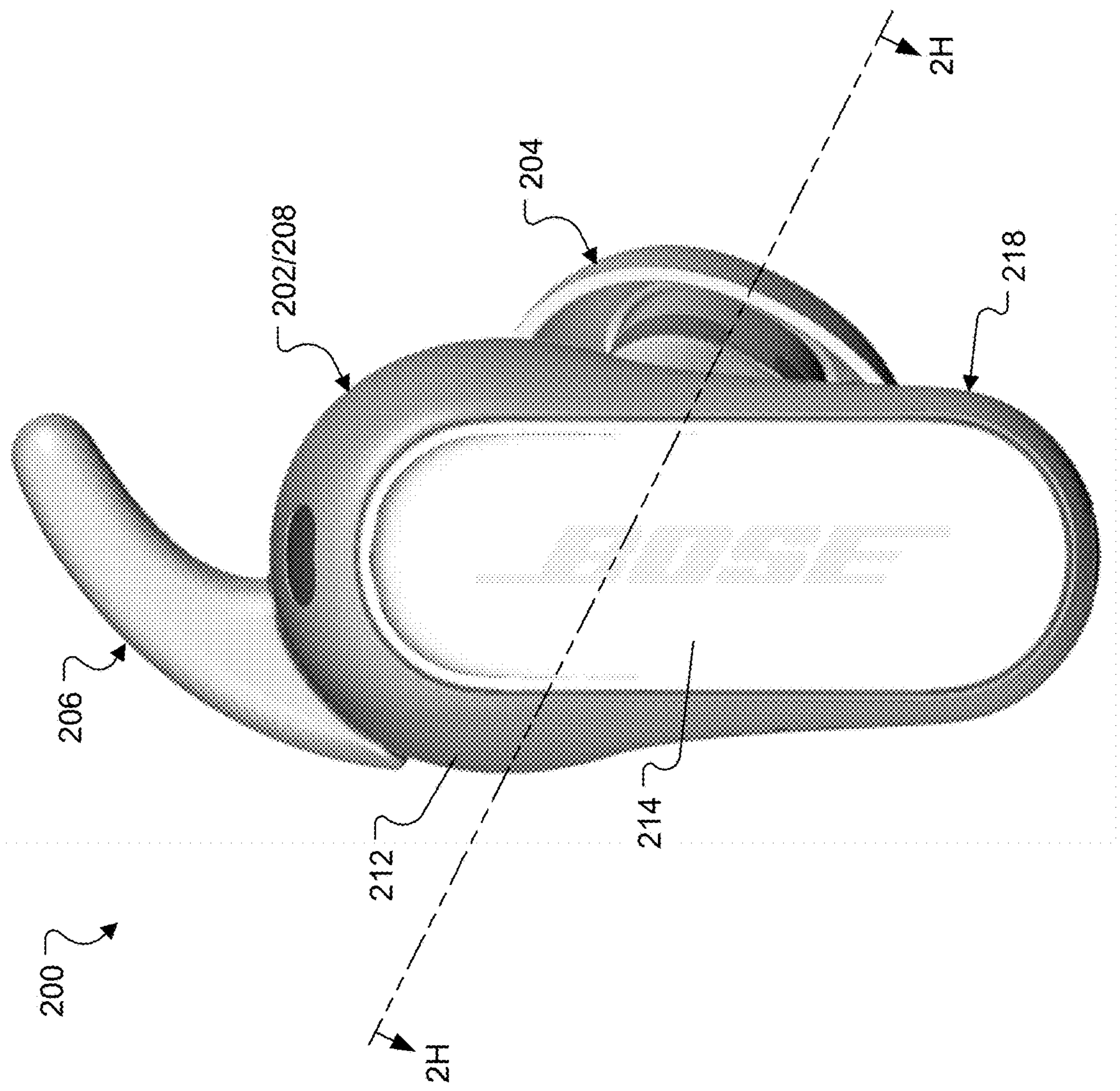
Figure 2E:
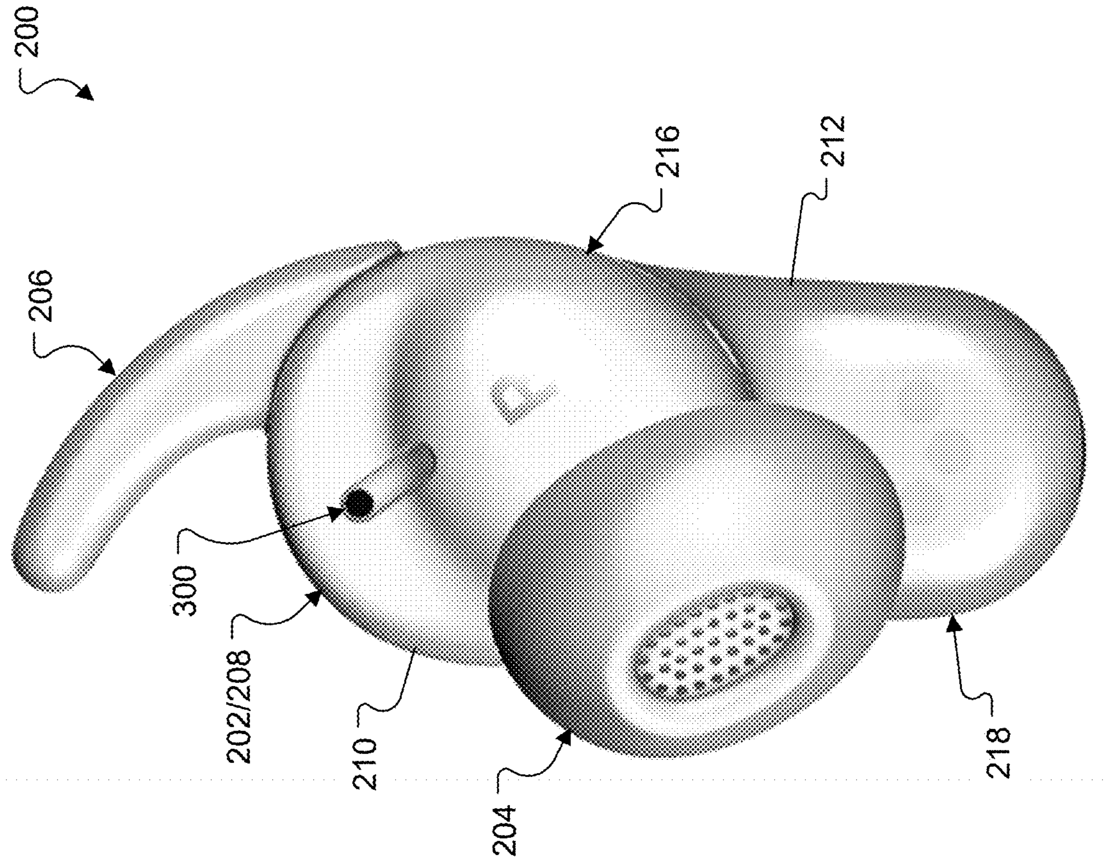
Figure 2F:
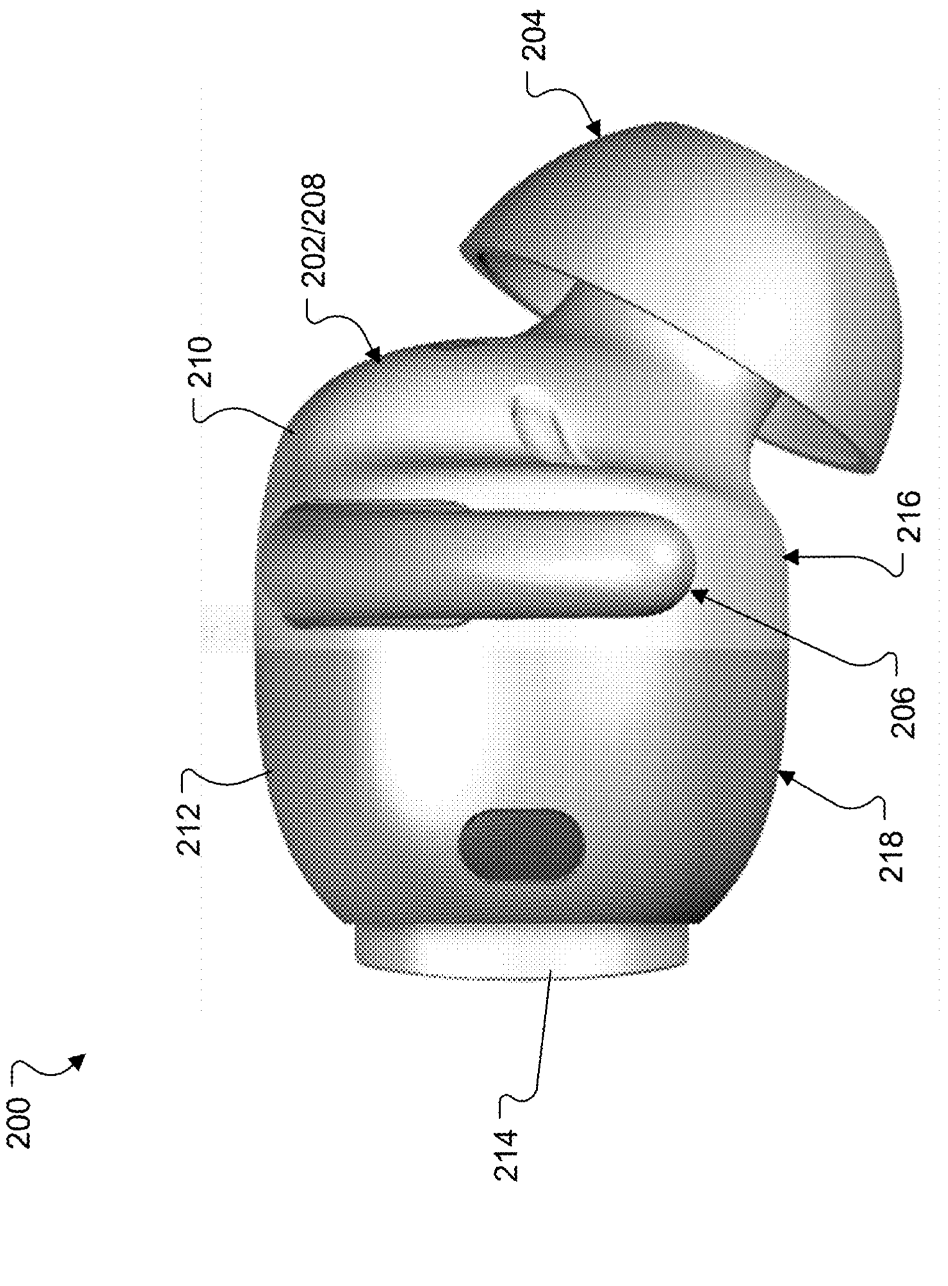
Figure 2G:
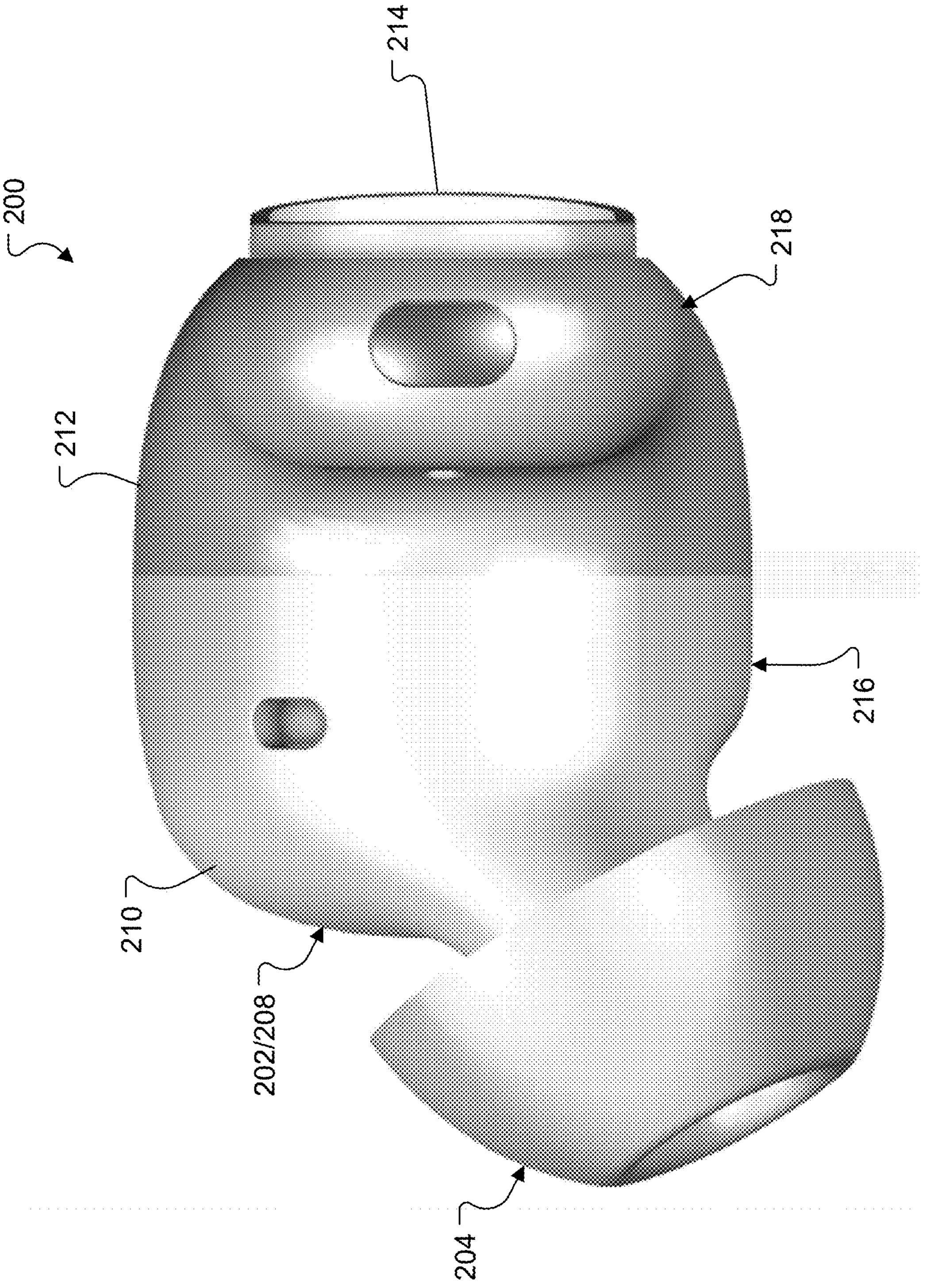
Figure 2H:
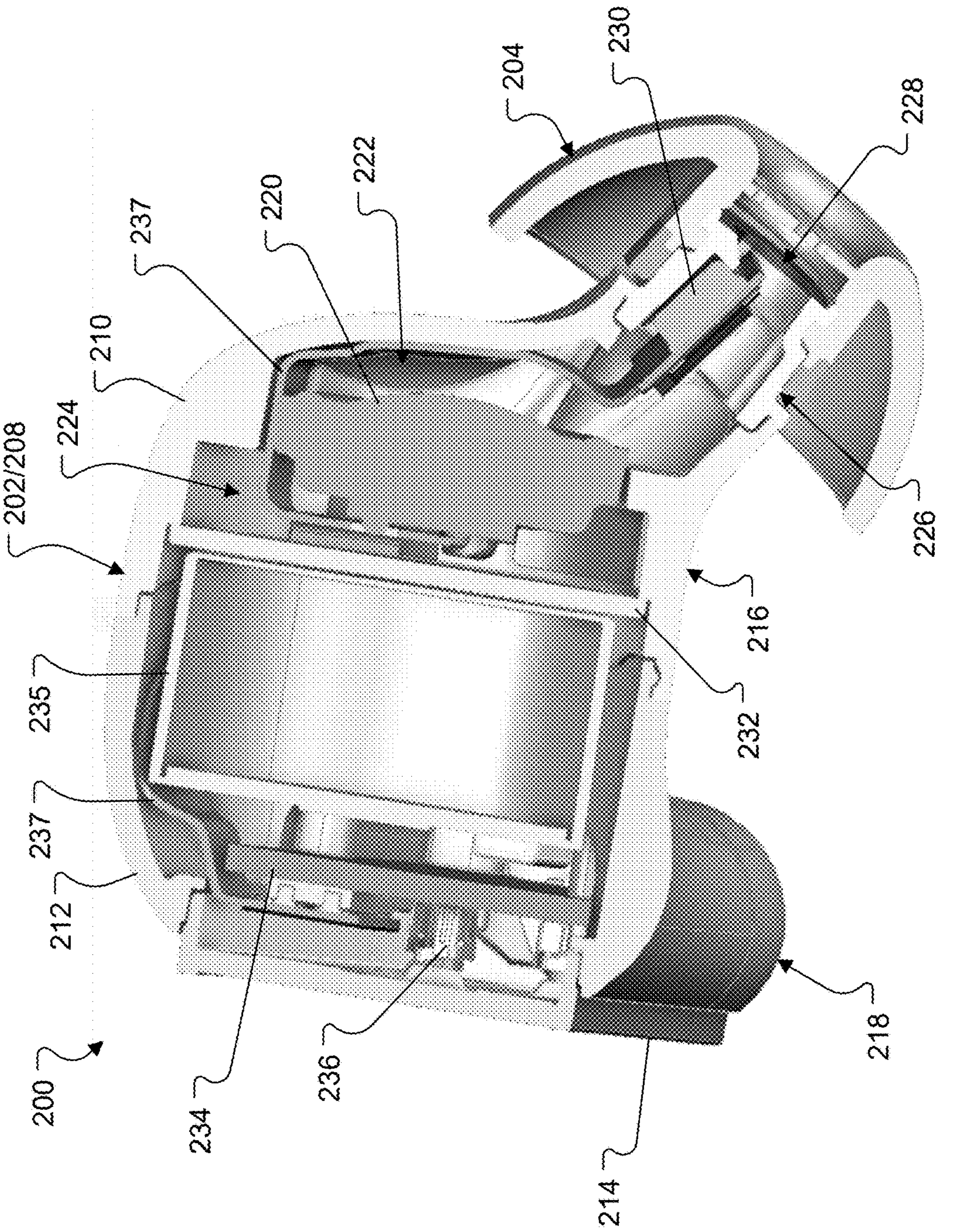
FIG. 2H is a sectional view of the earpiece of FIG. 2A taken along line 2H-2H in FIG. 2D.

With reference to FIG. 2H, the acoustic module 216 contains/houses an electro-acoustic transducer 220 that divides the acoustic module 216 into a first (front) acoustic cavity 222 and a second (rear) acoustic cavity 224. A first (front) side of the electro-acoustic transducer 220 radiates acoustic energy into the fist acoustic cavity 222 and a second (rear) side of the electro-acoustic transducer 220 radiates acoustic energy into the second acoustic cavity 224. A nozzle 226 is coupled to the housing 208 and is configured to direct acoustic energy from the first acoustic cavity 222 to a nozzle exit opening 228. An exterior surface of the nozzle 226 supports the ear tip 204. In some cases, a microphone 230, e.g., a feedback microphone for feedback noise cancellation, may be located within the nozzle 226. In some cases, the nozzle 226 may be formed integrally with the housing 208. For example, the nozzle 226 may be defined by the first housing portion 210. Alternatively, or additionally, the nozzle 226 may be formed, in whole or in part, as a separate housing portion and may be attached to the first housing portion 210, e.g., via an adhesive.

Figure 3A:
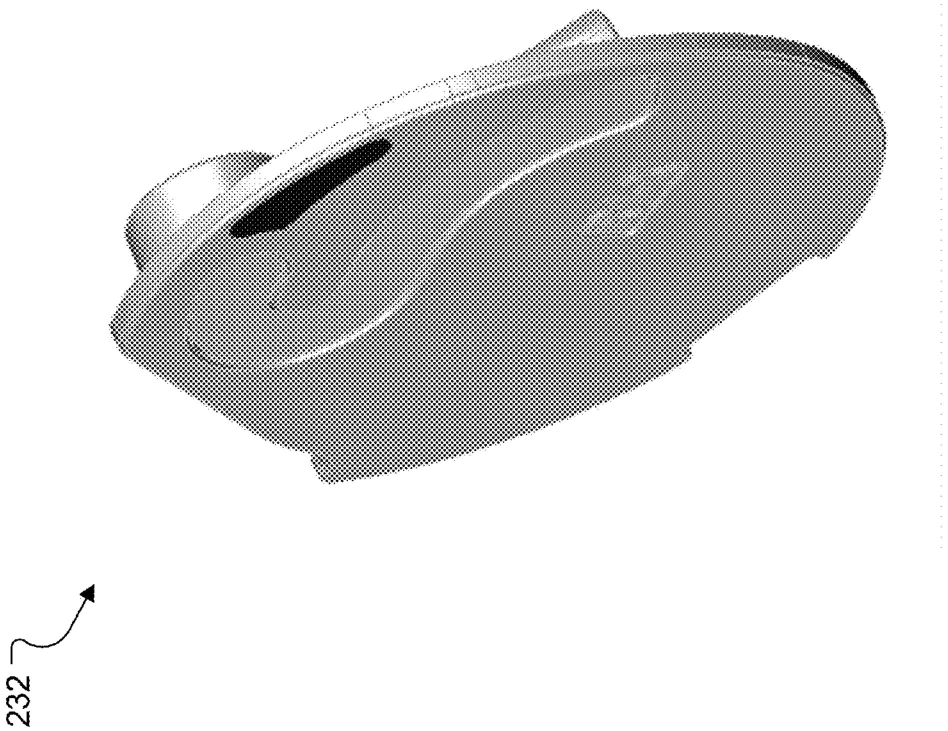
FIGS. 3A and 3B are perspective views of an internal dividing plate of the earpiece of FIG. 2A.
Figure 3B:
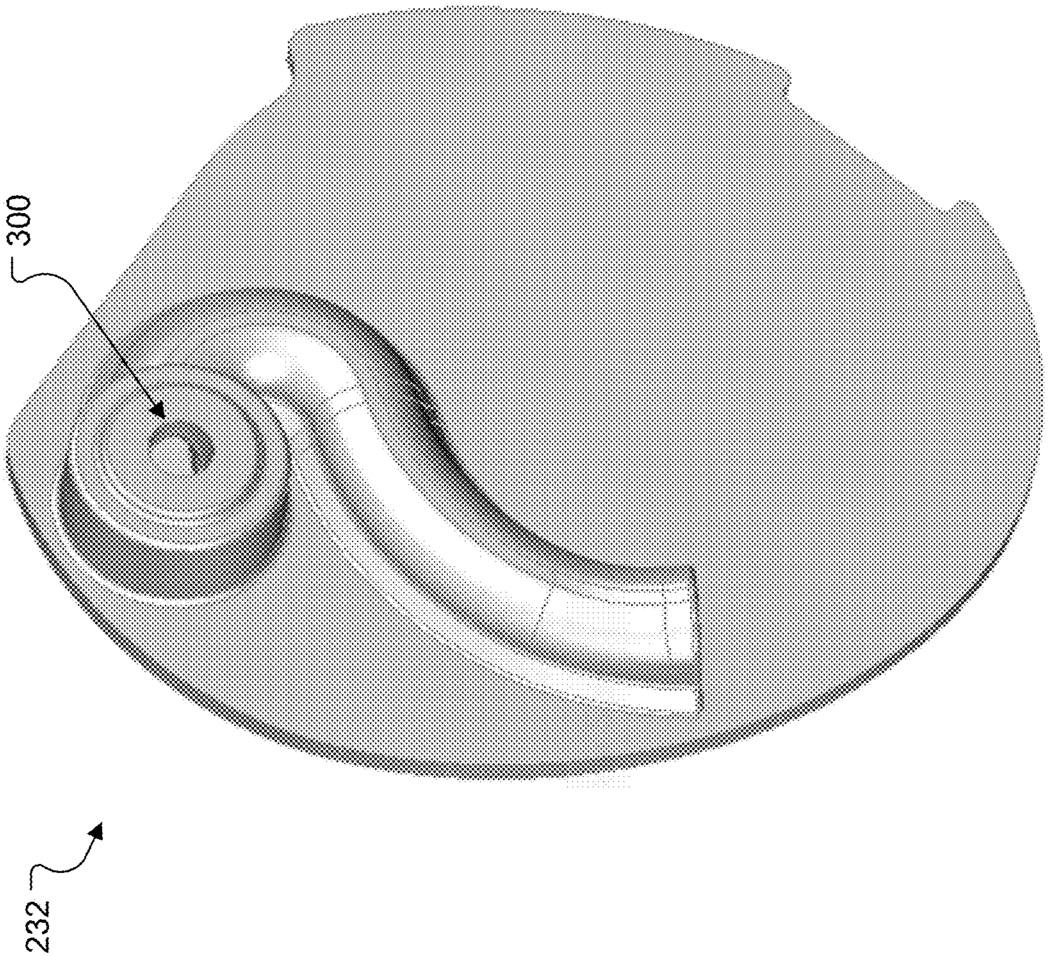

In the illustrated example, an internal dividing plate 232 is arranged between the second acoustic cavity 224 and the electronics module 218 and separates the acoustic module 216 from the electronics module 218. With reference to FIGS. 3A & 3B, the internal dividing plate 232 may also help to define an acoustic port 300 (e.g., a mass port) between the second acoustic cavity 224 and the external environment outside of the housing 208. Additional details regarding the internal dividing plate may be found in U.S. Pat. No. 11,638,081, titled "Earphone Port," which issued on Apr. 25, 2023. The complete disclosure of U.S. Pat. No. 11,638,081 is incorporated herein by reference.

Referring again to FIG. 2H, the electronics module 218 houses electronics for driving the electro-acoustic transducer 220. The electronics include a printed circuit board 234 that may support various electronic components (e.g., microprocessor, wireless transceiver, power management circuitry, digital signal processor (DSP)), a power source (e.g., a battery 235), one or more sensors (e.g., electrode(s) **400*b* (FIG. 4B) for a capacitive sensor 404), one or more electrical connectors, one or more microphones, and wiring (e.g., flexible printed circuitry 237) that electrically connects the electronics together and with the electro-acoustic transducer 220** and feedback microphone.

Figure 4A:
FIGS. 4A and 4 B are perspective views of a third housing portion of the earpiece of FIG. 2A.
Figure 4B:
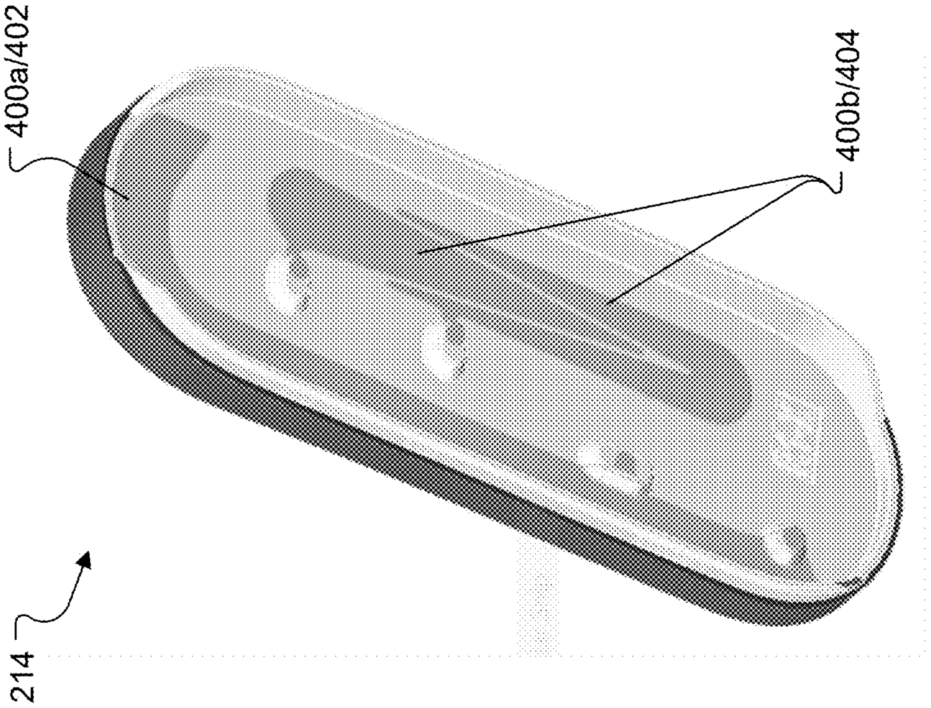

Referring to FIGS. 4A & 4B, the third housing portion 214 may carry electrically conductive traces **400*a*, 400*b* (generally "400") that may be formed directly on an inner surface of the third housing portion 214 (e.g., via laser direct structuring (LDS)). The traces 400 may form an antenna 402 for wireless communication and/or the traces 400 may form one or more electrodes for capacitive sensor 404. The traces 400 may be electrically connected to the printed circuit board 234 (FIG. 2H) via spring contacts 236 (FIG. 2H) mounted on the printed circuit board 234 that contact the traces 400 when the housing 208** is assembled. Additional details regarding the forming of an antenna or capacitive sensor electrodes using LDS on a cap of an earbud housing can be found in U.S. Pat. No. 11,115,745, titled "Systems and methods for antenna and ground plane mounting schemes for in-ear headphone," which issued Sep. 7, 2021. The complete disclosure of U.S. Pat. No. 11,115,745 is incorporated herein by reference.

Additional details regarding the ear tip may be found in U.S. Pat. No. 11,582,549, titled "Ear Tips and Related Devices and Methods," which issued on Feb. 14, 2023. The complete disclosure of U.S. Pat. No. 11,582,549 is incorporated herein by reference.

Figure 5A:
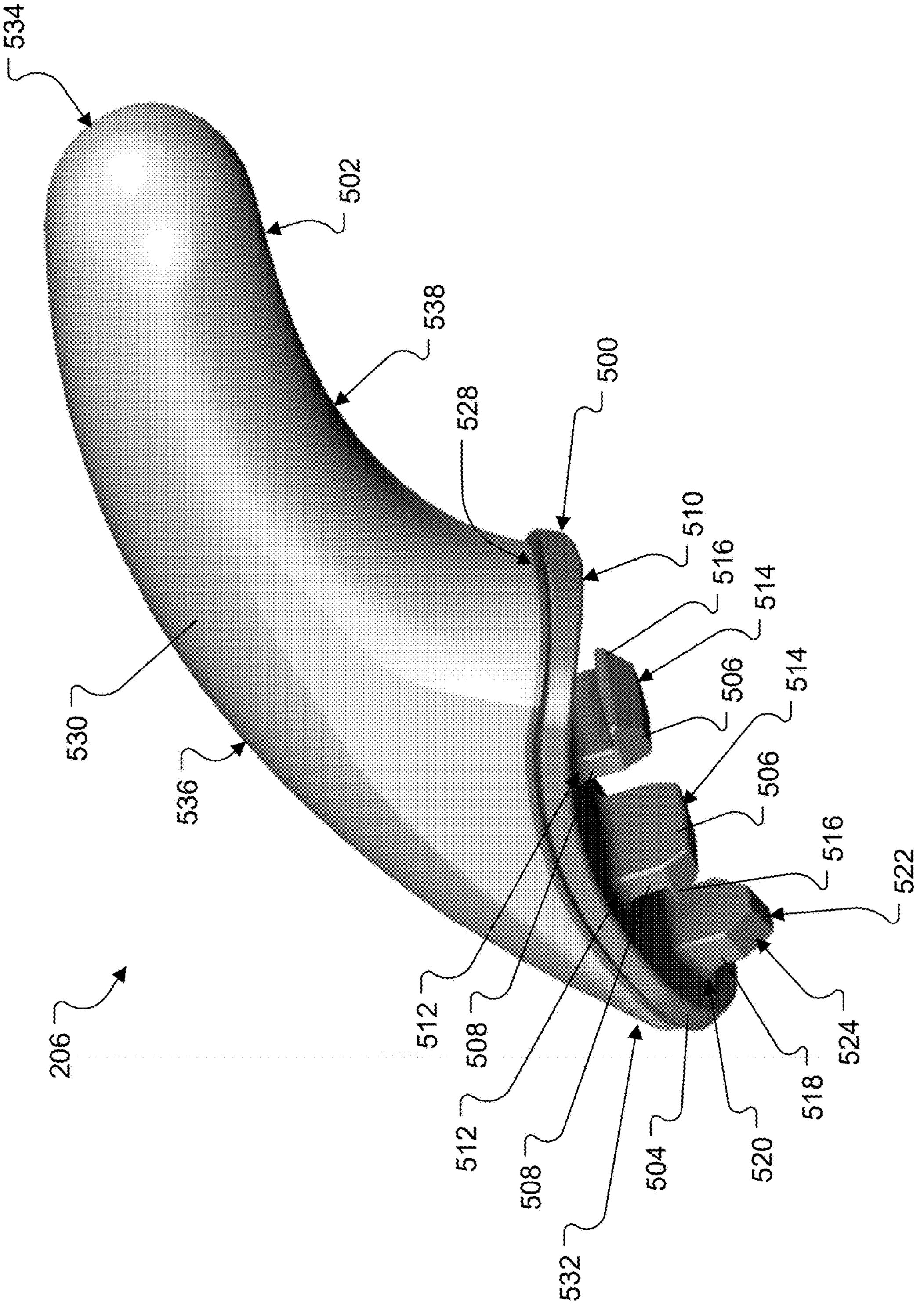
FIG. 5A is a perspective view of a retaining piece of the earpiece of FIG. 2A.
Figure 5B:
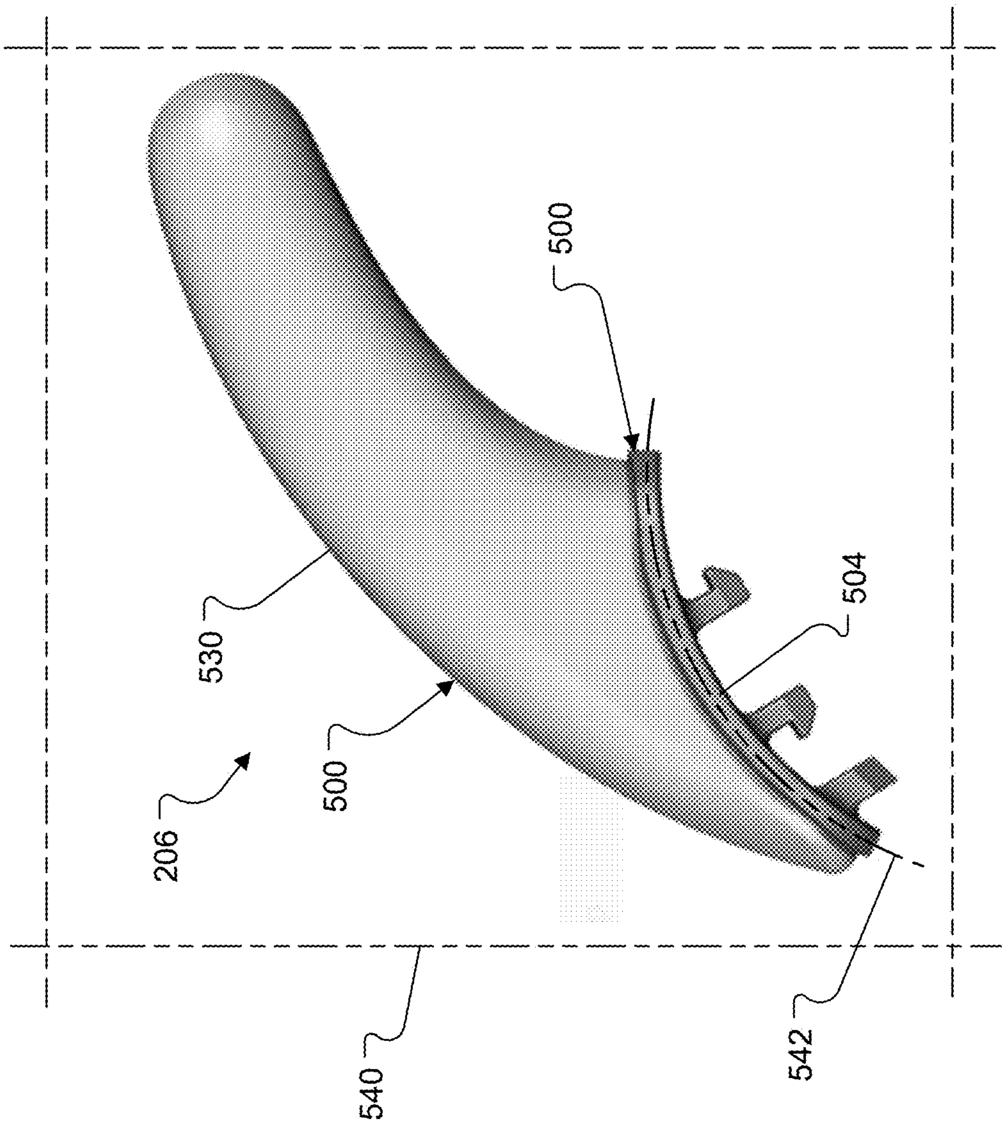
FIGS. 5B and 5C are side and top views, respectively, of the retaining piece of FIG. 5A.
Figure 5C:
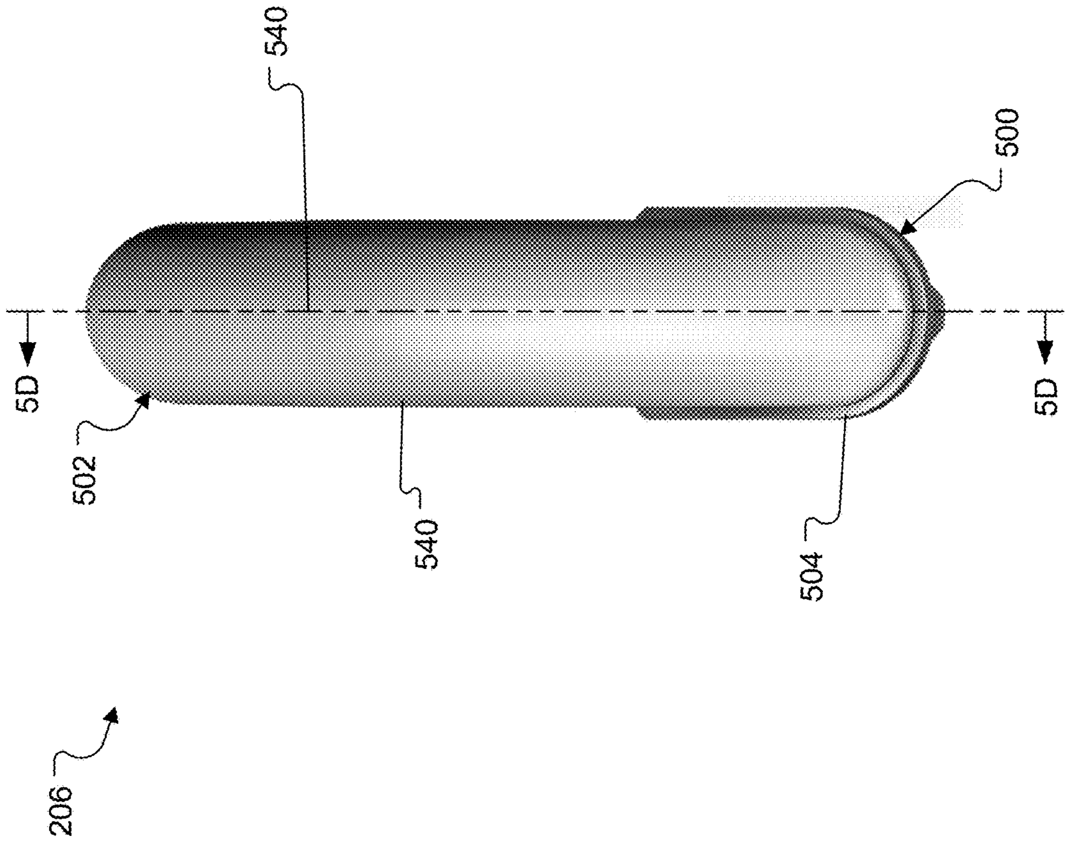

Referring to FIG. 5A-5C, the retaining piece 206 includes a coupling member 500 and a compliant member 502. The coupling member 500 is configured to secure the retaining piece 206 to the housing 208 (FIG. 2A). In that regard, the coupling member 500 includes a base 504 and a pair of snaps 506 that engage a pocket 600 (FIG. 6) in the housing 208. Each of the two snaps 506 includes a protrusion 508 that is connected to a bottom surface 510 of the base 504 at a first end 512. The snaps 506 each include a second end 514, opposite the first end 512, and an extension 516 that extends outwardly from the second end 514.

Figure 6:
FIG. 6 is a perspective view of the earpiece of FIG. 2A shown without the retaining piece.
Figure 7A:
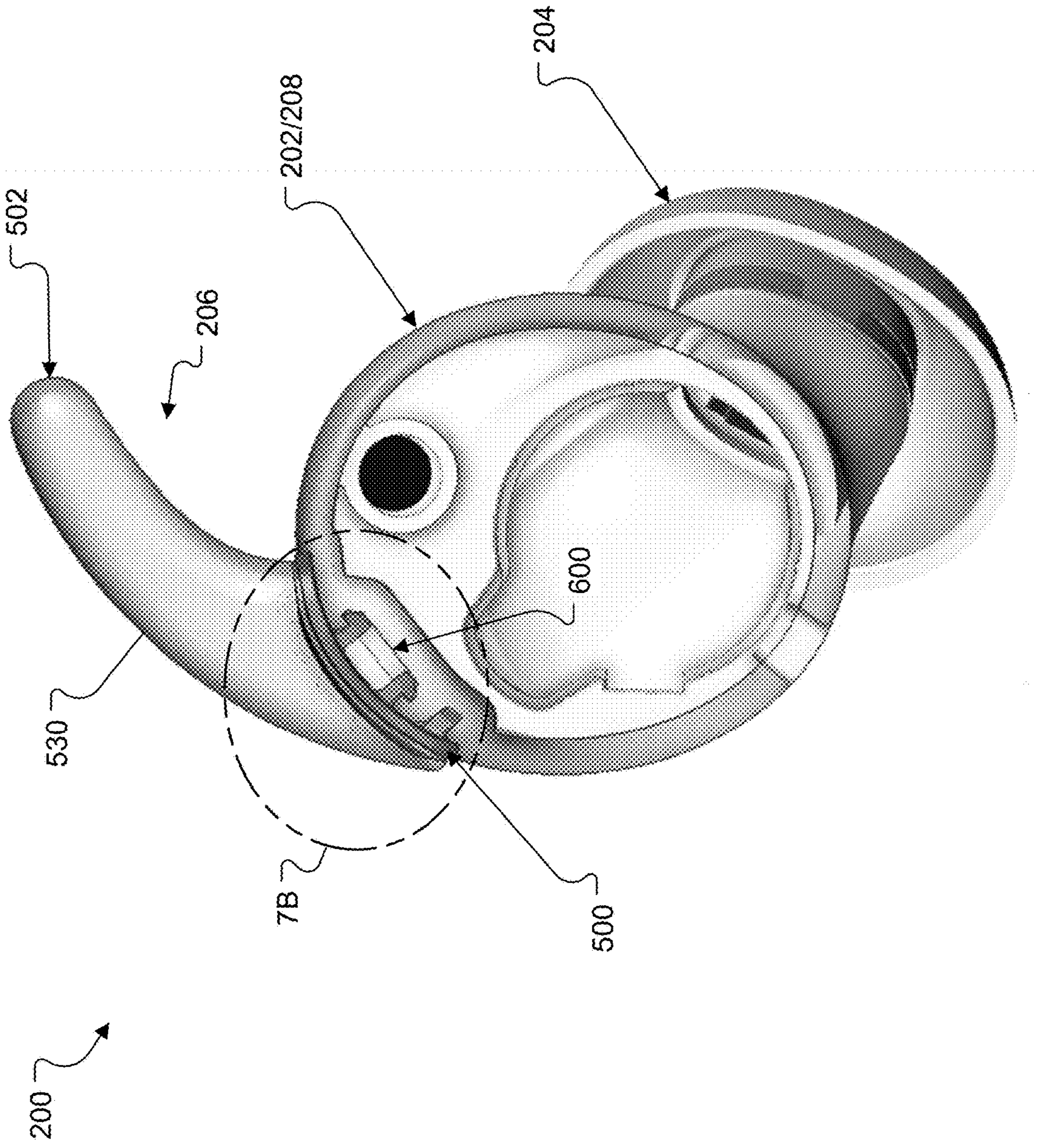
FIG. 7A is a sectional view of the earpiece of FIG. 2A showing attachment of the retaining piece to a housing of the earpiece.
Figure 7B:
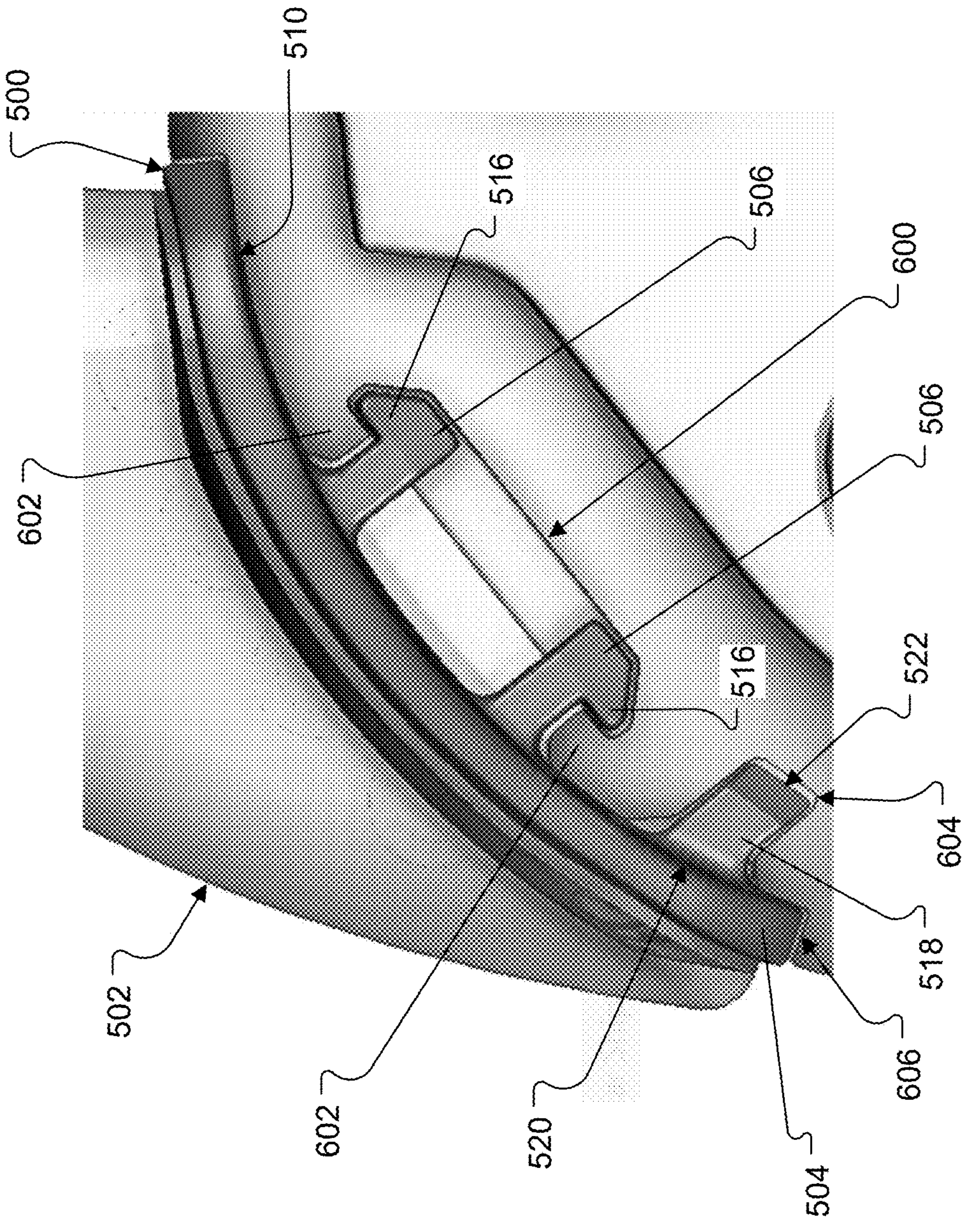
FIG. 7B is a detailed view from FIG. 7A.

Referring to FIGS. 6, 7A & 7B, the snaps are received within the pocket 600 in the housing 208. The pocket 600 includes one or more overhang(s) 602 (FIG. 7B) that engage the extensions 516 on the snaps 506 to secure the retaining piece 206 to the housing 208.

The coupling member 500 is also provided with an alignment pin 518 that is arranged to engage a socket 604 in the housing 208 to prevent the retaining piece 206 from being installed incorrectly (e.g., backwards). The alignment pin 518 extends outwardly from the bottom surface 510 of the base 504. The alignment pin 518 includes a first end 520 that is connected to the bottom surface 510 of the base 504 and a second end 522, opposite the first end, that includes chamfered edges 524 (FIG. 5A). The base 504 is configured to rest at least partially within a recess 606 in the earbud housing 208. As shown in the illustrated example, the recess 606 may be defined by the first housing portion 210. The base 504 and the recess 606 may have corresponding shapes that also inhibit incorrect installation.

Figure 5D:
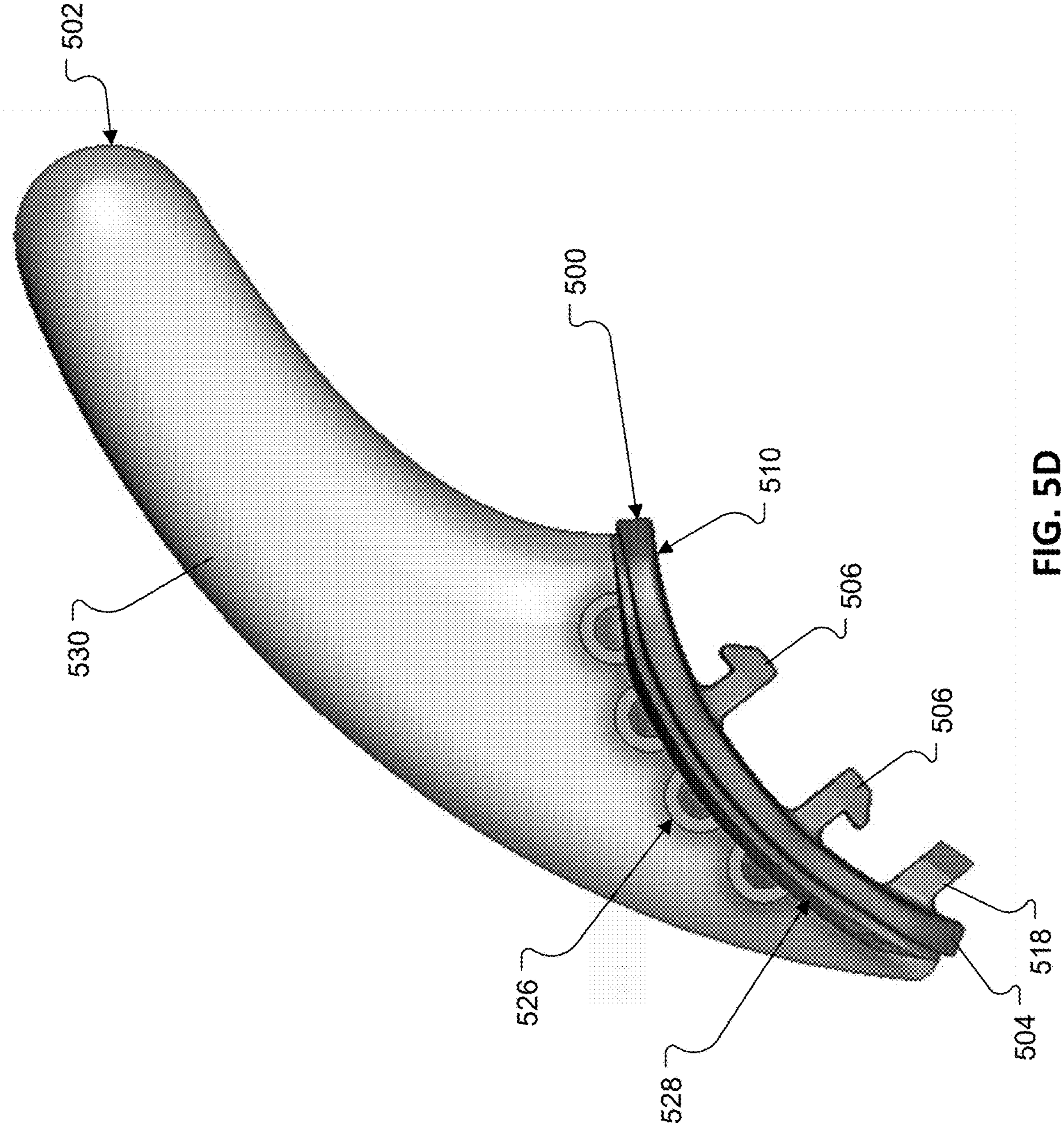
FIG. 5D is a sectional view of the retaining piece of 5A taken along line 5D-5D in FIG. 5C.

Referring to FIG. 5D, the coupling member 500 may also include one or more protuberances (e.g., loops 526) along a top surface 528, opposite the bottom surface 510, of the base 528. The compliant member 502 may be molded directly on top of the coupling member 500 (e.g., in a double-shot fabrication process) and the loops 526 can allow for better retention of the complaint member 502 to the base 504. The base 504, snaps 506, alignment pin 518 and loops 526 may be integrally formed as a unitary body. The coupling member 500 may be formed of a rigid plastic including thermoplastic materials such as polycarbonate, polybutylene terephthalate (PBT) and polyethylene terephthalate (PET), polycarbonate/acrylonitrile butadiene styrene (PC/ABS), polyamide (nylon), polyether ether ketone (PEEK), or acrylonitrile butadiene styrene (ABS). Such thermoplastic materials may include glass-fill for stiffness. While loops are show, protuberances of other shapes may also be used, such as hooks and mushroom shaped protuberances.

The compliant member 502 includes a leg 530 that is connected to the coupling member 500 at a first end 532 and generally extends outwardly from the top surface 528 of the base 504. The leg 530 is curved to generally follow the curve of the anti-helix at the rear of the concha. A second, free end 534 of the leg 530 is configured to be wedged under the anti-helix in the cymba concha region and contact the base of the helix. When the earpiece 200 is in position, a reaction force may be exerted that urges an outer radial edge 536 of the leg 530 against the anti-helix at the rear of the concha. In one implementation, the leg 530 is made of silicone, with a durometer of about 16 Shore A to about 30 Shore A. In other implementations, the leg 350 may be formed of thermoplastic elastomer (TPE).

Wherein the outer radial edge 536 of the leg 530 has a substantially constant radius of curvature along its length in a resting position, i.e., when the retaining piece is not engaged with a user's ear. The constant radius of curvature of the outer radial edge 536 of the leg 530 is about 10 mm to about 20 mm. The leg 530 also includes an inner radial edge 538, opposite the out radial edge 536, that has a substantially constant radius of curvature in the resting position. The constant radius of curvature of the inner radial edge 538 is about 5 mm to about 20 mm.

With reference to FIGS. 5B & 5C, the leg 530 lies in a plane 540, which bisects the leg 530. A longitudinal axis 542 of the base 504 is coincident with the plane 540. The leg 530 is symmetrical about the plane 540. This symmetry about the plane 540 and about the longitudinal axis 542 of the base 504 can enable the same retaining piece 206 to be used with either the left or right earbud 202. That can reduce the number of different parts for the earpiece 200 and it can also inhibit incorrect mounting of the retaining piece 206 (e.g., mounting a left retaining piece on a right earbud). The coupling member 500 may similarly be symmetrical about the plane 540.

OTHER IMPLEMENTATIONS

Figure 8:
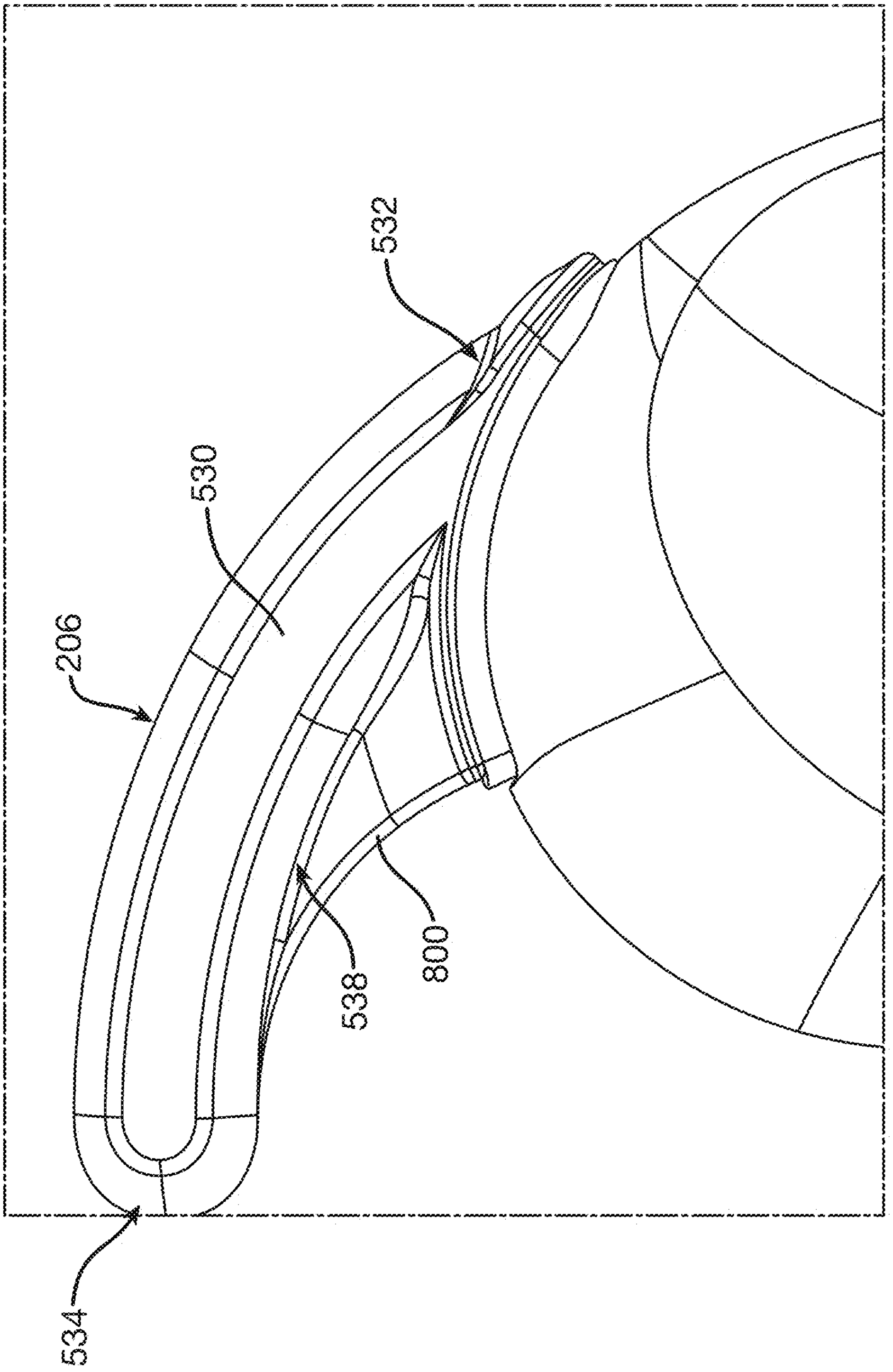
FIG. 8 is an alternative implementation of a retaining piece.

FIG. 8 illustrated another implementation of the retaining piece 206 in which the leg 530 has a substantially constant cross-sectional area along its length from its first end 532 to its second end 534. The retaining piece 206 of FIG. 8 includes a web 800 along inner radial edge 538 of the leg 530 that extends between the base 504 and the second end of the retaining piece 534. The web 800 has a thinner cross-sectional area than the leg 530 and serves the function of adding some stiffness without significantly increasing the collapsed thickness of the arm.

Figure 9:
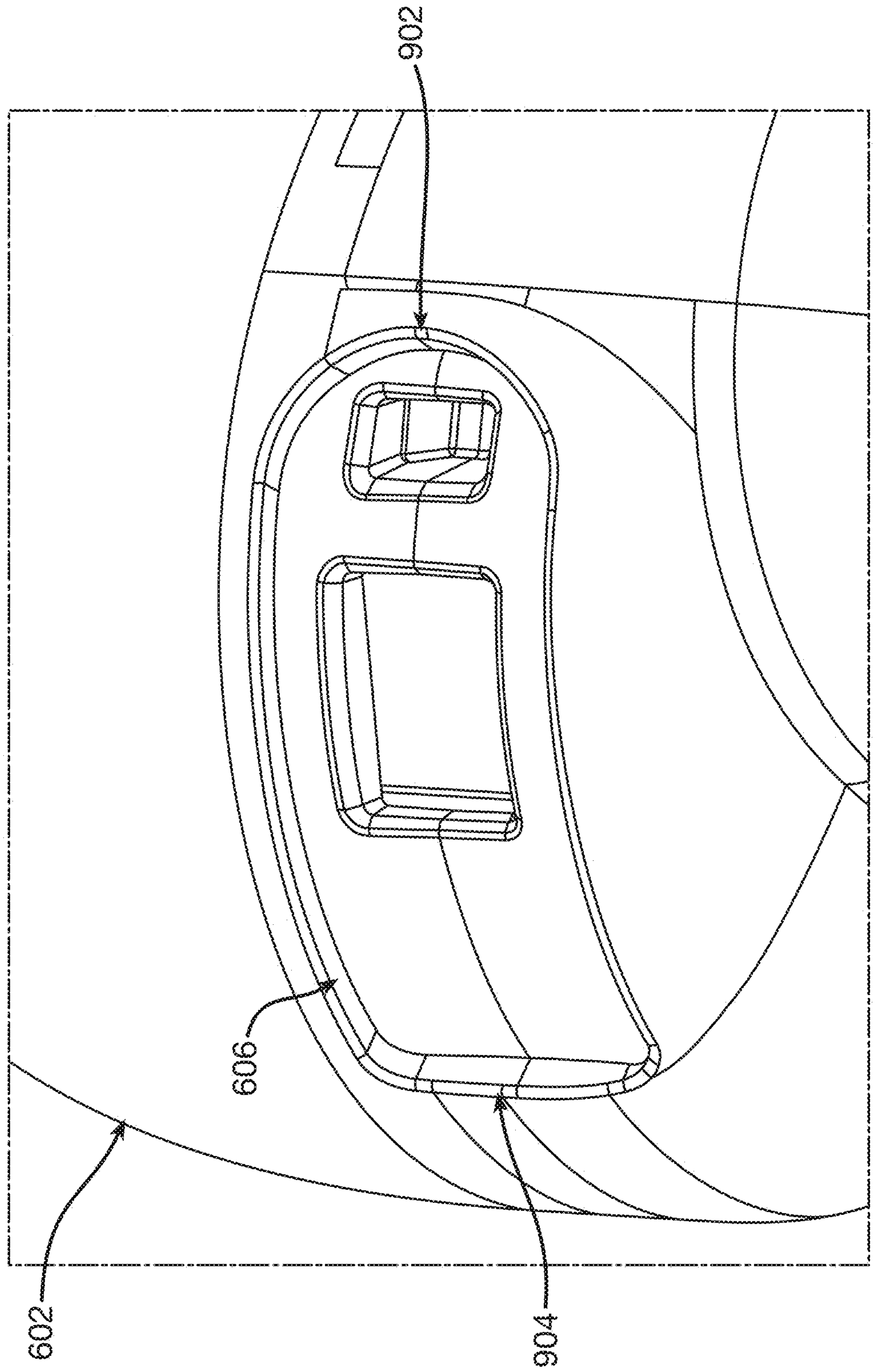
FIG. 9 is an alternative implementation of an earpiece housing.

FIG. 9 illustrates an alternative implementation of the recess 606. In the implementation illustrated in FIG. 9 the recess 606 is asymmetrical front to back, i.e., the recess 606 has a rounded front edge 902 and a square or flat rear edge 904. The recess 606 is keyed to a base of a retaining piece that would also be asymmetrical front to back. This asymmetry further inhibits incorrect installation of the retaining piece in the earbud 202.

Figure 10:
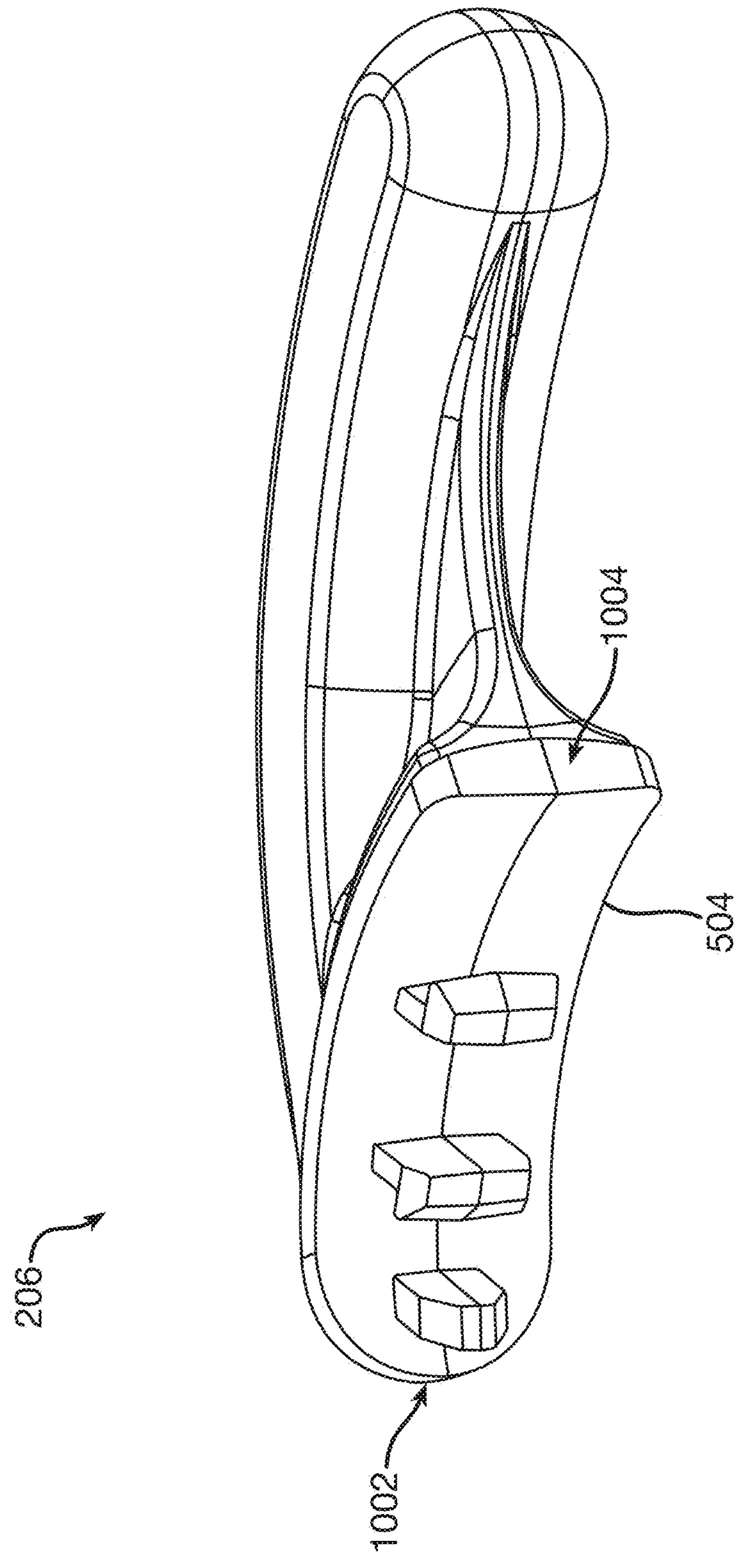
FIG. 10 is an alternative implementation of a retaining piece for use with the housing of FIG. 9.

FIG. 10 shows the retaining piece 206 with the complementary base 504 for coupling with the asymmetrical recess 606 shown in FIG. 9. In the implementation illustrated in FIG. 10, the base 504 includes a rounded front edge 1002 and a square or flat rear edge 1004 that are keyed to the rounded front edge 902 and the flat rear edge 904, respectively, of the recess 606 shown in FIG. 9.

Some implementations may include more or fewer snaps. For example, while implementations of a retention piece with two snaps have been described, some implementations may have a single snap.

Figure 11A:
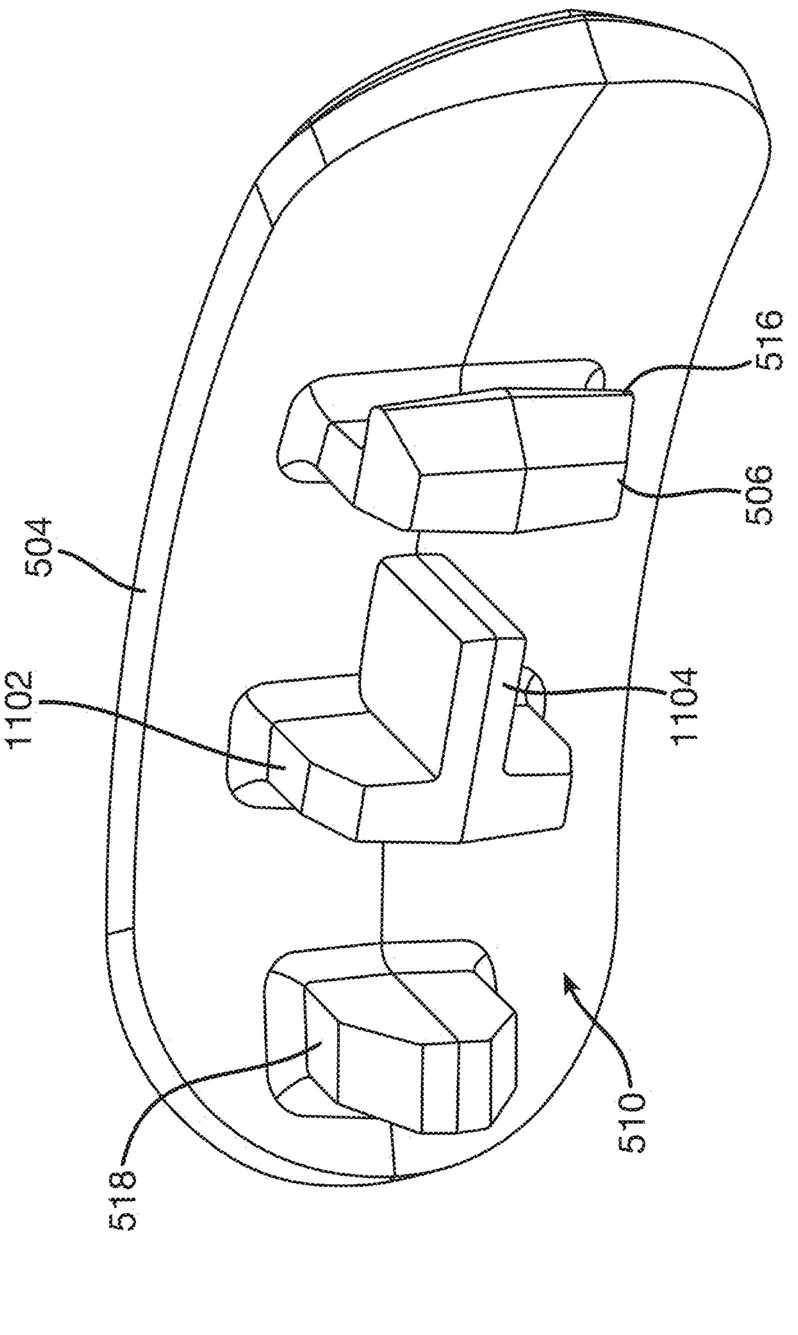
FIGS. 11A and 11B illustrate yet another alternative implementation of a retaining piece with a single snap.
Figure 11B:
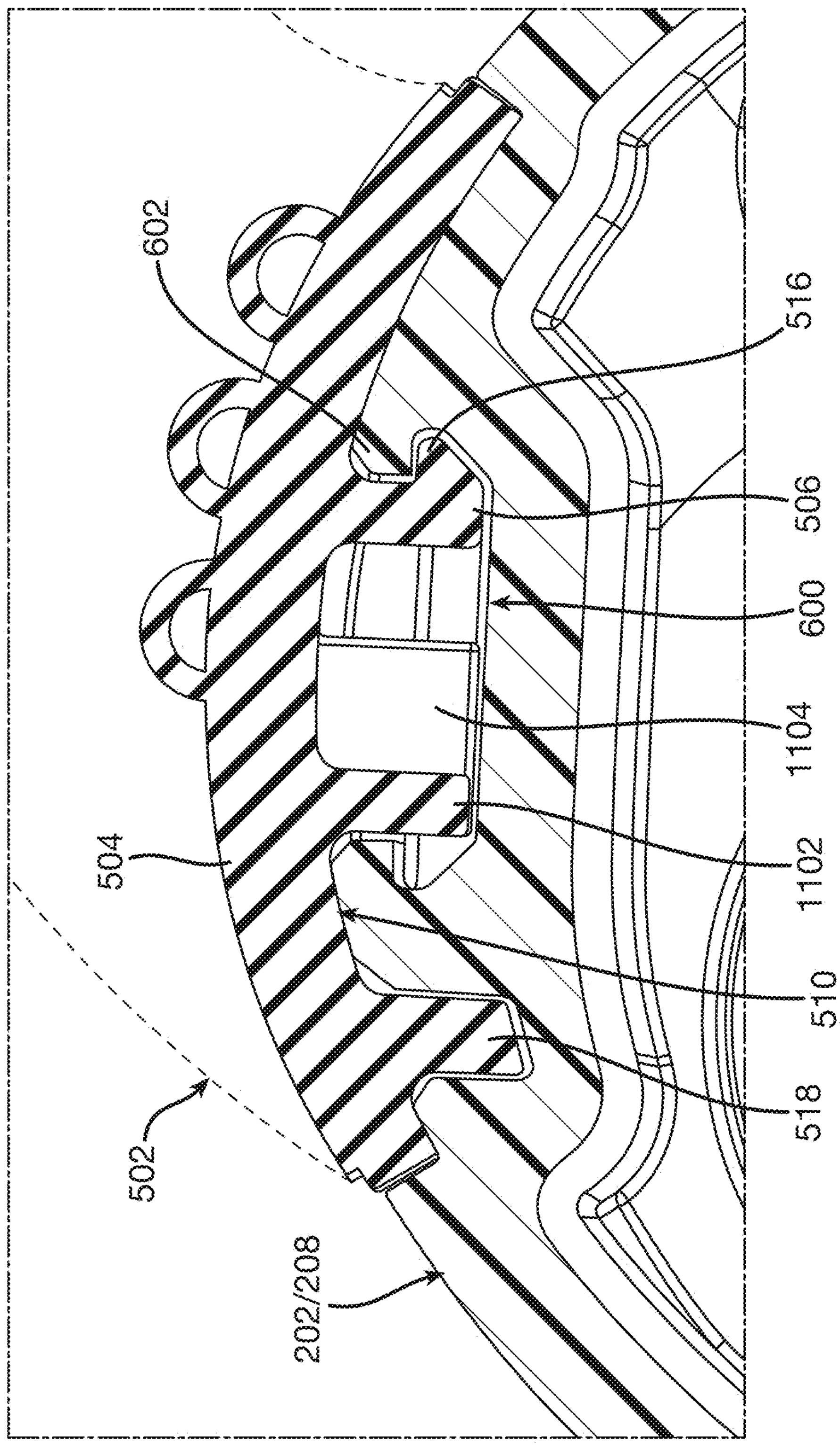

FIGS. 11A and 11B illustrate an implementation of a base 504 that includes a single snap 506. In the implementation illustrated in FIGS. 11A & 11B, a protuberance 1102 is provided between the alignment pin 518 and the single snap 506. A stiffening rib 1104 extends out from a center of the protuberance 1102 and is substantially perpendicular thereto. Both the protuberance 1102 and the stiffening rib 1104 extend outwardly from the bottom surface 510 of the base 504, and each include a respective first end that is secured to the base and a respective second, free end. Unlike the snap 506, the protuberance 1102 includes no extension 516 to engage the overhang 602 in the pocket 600 (FIG. 11B). The snap 506, the alignment pin 518, the protuberance 1102, and the stiffening rib 1104 may all be integrally formed (e.g., molded as a single part) with the base 504.

In the implementation illustrated in FIGS. 11A & 11B, the alignment pin 518 provides course alignment, the protuberance 1102 provides fine alignment, and the single snap 506 engages the overhang 602 in the pocket 600 to secure the retention member to the housing 208.

In other implementations, the orientation of the snaps may be reversed snaps snap towards each other rather than away from each other.

In certain implementations, the two snaps may be rotated 90 degrees (relative to their respective positions shown, e.g., in FIG. 5A-5D) so that they are parallel to plane 540 (FIG. 5B) instead of perpendicular to that plane 540 and such that they are symmetrical about plane 540 with one above the plane and one below the plane. E.g., such that plane extends between the snaps rather than bisecting the snaps.

A number of implementations have been described. Nevertheless, it will be understood that additional modifications may be made without departing from the scope of the inventive concepts described herein, and, accordingly, other implementations are within the scope of the following claims.

What is claimed is:

1. A retaining piece for an earpiece, the retaining piece comprising:
- a compliant member for engaging a user's concha; and
- a coupling member for engaging an earbud of the earpiece,
- wherein the coupling member comprises a snap for engaging a pocket in the earbud,
- wherein the coupling member further comprises a base,
- wherein the snap extends outwardly from a bottom surface of the base, and
- wherein the coupling member further comprises an alignment pin having a first end that is connected to the bottom surface of the base and a second end, opposite the first end, that includes chamfered edges;
- wherein the compliant member comprises a leg that extends outwardly from a top surface of the base; wherein the leg lies in a plane, which bisects the leg, and wherein a longitudinal axis of the base is coincident with the plane; wherein the plane bisects the coupling member such that the coupling member is symmetrical about the plane.

2. The retaining piece of claim 1, wherein an alignment pin is arranged to engage a socket in the earbud.

3. The retaining piece of claim 1, wherein the snap includes a protrusion having a first end that is connected to the bottom surface of the base; a second end, opposite the first end; and an extension that extends outwardly from the second end.

4. The retaining piece of claim 1, wherein the snap is formed integrally with the base.

5. A retaining piece for an earpiece, the retaining piece comprising:

a compliant member for engaging a user's concha; and a coupling member for engaging an earbud of the earpiece, wherein the coupling member comprises a snap for engaging a pocket in the earbud, wherein the coupling member further comprises a base, wherein the snap extends outwardly from a bottom surface of the base, and wherein the coupling member further comprises an alignment pin that extends outwardly from the bottom surface of the base;

wherein the compliant member comprises a leg that extends outwardly from a top surface of the base; wherein the leg lies in a plane, which bisects the leg, and wherein a longitudinal axis of the base is coincident with the plane; wherein the plane bisects the coupling member such that the coupling member is symmetrical about the plane.

6. The retaining piece of claim 5, wherein the base, the snap, and the alignment pin are integrally formed as an unitary body.

7. The retaining piece of claim 5, wherein the coupling member further comprises one or more loops arranged along the top surface, opposite the bottom surface, of the base.

8. The retaining piece of claim 7, wherein the base, the snap, the alignment pin and the one or more loops are integrally formed as a unitary body.

9. The retaining piece of claim 1, wherein the snap and base are formed of a thermoplastic material.

10. The retaining piece of claim 1, wherein the compliant member comprises the leg that is configured to fit under an antihelix of a wearer's ear when the earpiece is worn.

11. The retaining piece of claim 10, wherein the leg applies pressure to the user's ear along the antihelix such that the retaining piece creates stability and pushes the earpiece towards the user's ear canal.

12. A retaining piece for an earpiece, the retaining piece comprising: a compliant member for engaging a user's concha; and a coupling member for engaging an earbud of the earpiece, wherein the coupling member comprises a snap for engaging a pocket in the earbud, wherein the coupling member further comprises a base and one or more loops disposed along a top surface of the base, and wherein the compliant member is molded directly on the top surface of the base such that the one or more loops are encapsulated by the compliant member; wherein the compliant member comprises a leg that extends outwardly from the top surface of the base; wherein the leg lies in a plane, which bisects the leg, and wherein a longitudinal axis of the base is coincident with the plane; wherein the plane bisects the coupling member such that the coupling member is symmetrical about the plane.

13. The retaining piece of claim 12, wherein the leg includes: a first end that is connected to the coupling member; and a second, free end, opposite the first end, that is configured to be wedged under the anti-helix in the cymba concha region and contact a base of the helix.

14. The retaining piece of claim 12, wherein the leg is curved to generally follow the curve of the anti-helix at a rear of the concha.

15. The retaining piece of claim 12, wherein the leg is made of silicone or thermoplastic elastomer (TPE), and has a durometer of between about 16 Shore A to about 30 Shore A.

16. The retaining piece of claim 1, wherein the compliant member is made of silicone or thermoplastic elastomer, and has a durometer of between about 16 Shore A to about 30 Shore A.

17. A retaining piece for an earpiece, the retaining piece comprising:

a compliant member for engaging a user's concha; and a coupling member for engaging an earbud of the earpiece, wherein the coupling member comprises a snap for engaging a pocket in the earbud, and wherein the snap comprises a plurality of snaps;

wherein the compliant member comprises a leg that extends outwardly from a top surface of a base;

wherein the leg lies in a plane, which bisects the leg, and wherein a longitudinal axis of the base is coincident with the plane; wherein the plane bisects the coupling member such that the coupling member is symmetrical about the plane.

18. The retaining piece of claim 17, wherein the coupling member further comprises a base, and wherein each of the snaps includes a protrusion having a first end that is connected to a bottom surface of the base; a second end, opposite the first end; and an extension that extends outwardly from the second end.

19. The retaining piece of claim 17, wherein the coupling member further comprises a protuberance.

20. The retaining piece of claim 17, wherein the coupling member further comprises a protuberance and a stiffening rib.

21. The retaining piece of claim 20, wherein the stiffening rib extends out from a center of the protuberance and is substantially perpendicular thereto.

22. The retaining piece of claim 21, wherein the protuberance and the stiffening rib extend outwardly from a bottom surface of the base.

23. The retaining piece of claim 22, wherein the base, the snap, the protuberance, and the stiffening rib are integrally formed as an unitary body.

* * * * *